(12) United States Patent
Barsalou

(10) Patent No.: US 11,520,635 B2
(45) Date of Patent: Dec. 6, 2022

(54) TECHNIQUES FOR RESOLVING APPLICATION UPDATES

(71) Applicant: Oracle International Corporation, Redwood Shores, CA (US)

(72) Inventor: Eric Tyler Barsalou, Seattle, WA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 0 days.

(21) Appl. No.: 17/103,733

(22) Filed: Nov. 24, 2020

(65) Prior Publication Data

US 2021/0224132 A1 Jul. 22, 2021

Related U.S. Application Data

(60) Provisional application No. 62/963,456, filed on Jan. 20, 2020, provisional application No. 62/963,452, (Continued)

(51) Int. Cl.
*G06F 9/50* (2006.01)
*H04L 41/5054* (2022.01)
(Continued)

(52) U.S. Cl.
CPC .......... *G06F 9/5061* (2013.01); *G06F 3/0484* (2013.01); *G06F 8/60* (2013.01);
(Continued)

(58) Field of Classification Search
CPC ..... G06F 8/71; G06F 8/65; G06F 8/70; G06F 8/76; G06F 11/3688; G06F 11/36;
(Continued)

(56) References Cited

U.S. PATENT DOCUMENTS

| 2015/0143355 A1 | 5/2015 | Tingstrom et al. |
| 2016/0092526 A1* | 3/2016 | Kothari ................... G06F 16/13 707/602 |

(Continued)

OTHER PUBLICATIONS

A. Sarma, D. F. Redmiles and A. van der Hoek, "Palantír: Early Detection of Development Conflicts Arising from Parallel Code Changes," in IEEE Transactions on Software Engineering, vol. 38, No. 4, pp. 889-908, Jul.-Aug. 2012, doi: 10.1109/TSE.2011.64. (Year: 2012).*

(Continued)

*Primary Examiner* — Tom Y Chang
(74) *Attorney, Agent, or Firm* — Kilpatrick Townsend & Stockton LLP

(57) ABSTRACT

Techniques are disclosed for implementing, by a computer infrastructure orchestration service (CIOS) changes to a first service. The CIOS may manage a declarative infrastructure provisioner to deploy infrastructure resources and artifacts based at least in part on declarative instructions. CIOS may detect a first modification to a first service (e.g., a sidecar application). CIOS may identify that configuration data of a second service references (e.g., via a git submodule) the first service. In response to identifying a second modification to the second service, CIOS may present, via a graphical interface, changes comprising the first modification to the first service. User input may be received indicating acceptance or rejection of the changes of the first modification. CIOS may then implement the changes to the first service according to the user input. For example, CIOS may ensure that the first service, as modified, is deployed alongside the second service in subsequent deployments.

20 Claims, 12 Drawing Sheets

Related U.S. Application Data filed on Jan. 20, 2020, provisional application No. 62/963,481, filed on Jan. 20, 2020, provisional application No. 62/963,335, filed on Jan. 20, 2020, provisional application No. 62/963,478, filed on Jan. 20, 2020, provisional application No. 62/963,477, filed on Jan. 20, 2020, provisional application No. 62/963,480, filed on Jan. 20, 2020, provisional application No. 62/963,491, filed on Jan. 20, 2020, provisional application No. 62/963,486, filed on Jan. 20, 2020, provisional application No. 62/963,489, filed on Jan. 20, 2020, provisional application No. 62/963,413, filed on Jan. 20, 2020.

(51) Int. Cl.

| | |
|---|---|
| *G06F 8/71* | (2018.01) |
| *H04L 41/0816* | (2022.01) |
| *G06F 8/60* | (2018.01) |
| *H04L 41/5041* | (2022.01) |
| *H04L 41/50* | (2022.01) |
| *G06F 9/38* | (2018.01) |
| *G06F 9/4401* | (2018.01) |
| *H04L 41/0806* | (2022.01) |
| *G06F 9/48* | (2006.01) |
| *G06F 11/07* | (2006.01) |
| *G06F 11/32* | (2006.01) |
| *G06F 16/901* | (2019.01) |
| *G06F 9/445* | (2018.01) |
| *G06F 9/451* | (2018.01) |
| *G06F 3/0484* | (2022.01) |
| *H04L 67/00* | (2022.01) |
| *G06F 11/14* | (2006.01) |
| *G06F 11/36* | (2006.01) |
| *H04L 67/10* | (2022.01) |
| *H04L 67/1008* | (2022.01) |
| *H04L 67/1031* | (2022.01) |
| *H04L 67/566* | (2022.01) |
| *G06F 8/61* | (2018.01) |

(52) U.S. Cl.
CPC .............. *G06F 8/71* (2013.01); *G06F 9/3836* (2013.01); *G06F 9/4411* (2013.01); *G06F 9/44505* (2013.01); *G06F 9/451* (2018.02); *G06F 9/485* (2013.01); *G06F 9/4856* (2013.01); *G06F 9/505* (2013.01); *G06F 9/5011* (2013.01); *G06F 9/5022* (2013.01); *G06F 9/5027* (2013.01); *G06F 9/5038* (2013.01); *G06F 9/5072* (2013.01); *G06F 9/5077* (2013.01); *G06F 11/0757* (2013.01); *G06F 11/1469* (2013.01); *G06F 11/327* (2013.01); *G06F 11/3664* (2013.01); *G06F 11/3684* (2013.01); *G06F 16/9024* (2019.01); *H04L 41/0806* (2013.01); *H04L 41/0816* (2013.01); *H04L 41/5041* (2013.01); *H04L 41/5048* (2013.01); *H04L 41/5054* (2013.01); *H04L 41/5096* (2013.01); *H04L 67/10* (2013.01); *H04L 67/1008* (2013.01); *H04L 67/1031* (2013.01); *H04L 67/34* (2013.01); *H04L 67/566* (2022.05); *G06F 8/61* (2013.01)

(58) Field of Classification Search
CPC ............ G06F 11/3668; G06F 11/3696; G06F 11/368; G06F 11/362
See application file for complete search history.

(56) References Cited

U.S. PATENT DOCUMENTS

| | | | |
|---|---|---|---|
| 2016/0188325 | A1 | 6/2016 | Blitzstein |
| 2016/0335454 | A1* | 11/2016 | Choe .................... G06Q 30/018 |
| 2016/0371079 | A1* | 12/2016 | Balasubramanian ..... G06F 8/70 |
| 2019/0213115 | A1* | 7/2019 | Takawale .................. G06F 8/30 |
| 2020/0220848 | A1* | 7/2020 | Patwardhan ............ H04L 45/64 |
| 2020/0285462 | A1* | 9/2020 | Sabath ..................... G06F 8/71 |
| 2021/0019193 | A1* | 1/2021 | Ffrench ............... G06F 11/3604 |

OTHER PUBLICATIONS

CHASE '10: Proceedings of the 2010 ICSE Workshop on Cooperative and Human Aspects of Software EngineeringMay 2010 pp. 39-46https://doi.org/10.1145/1833310.1833317, May 2, 2010 (Year: 2010).*
AGS Data Diode Technical Requirements Programmatic Requirements, 3 pages.
AGS Technical Design, 13 pages.
Design Details, 5 pages.
Disconnected Region Support, 15 pages.
Shepherd Business Case and Executive Summary, 33 pages.
Shepherd Capabilities Service, 5 pages.
Shepherd Regional, 4 pages.
Shepherd Regional Control Plane, 4 pages.
Shepherd Regional Executor Service, 15 pages.
Terraform Yield, 6 pages.
International Application No. PCT/US2021/012222, International Search Report and Written Opinion dated May 6, 2021, 17 pages.
Sarma et al., Towards Supporting Awareness of Indirect Conflicts Across Software Configuration Management Workspaces, Automated Software Engineering, Nov. 5, 2007, pp. 94-103.

* cited by examiner

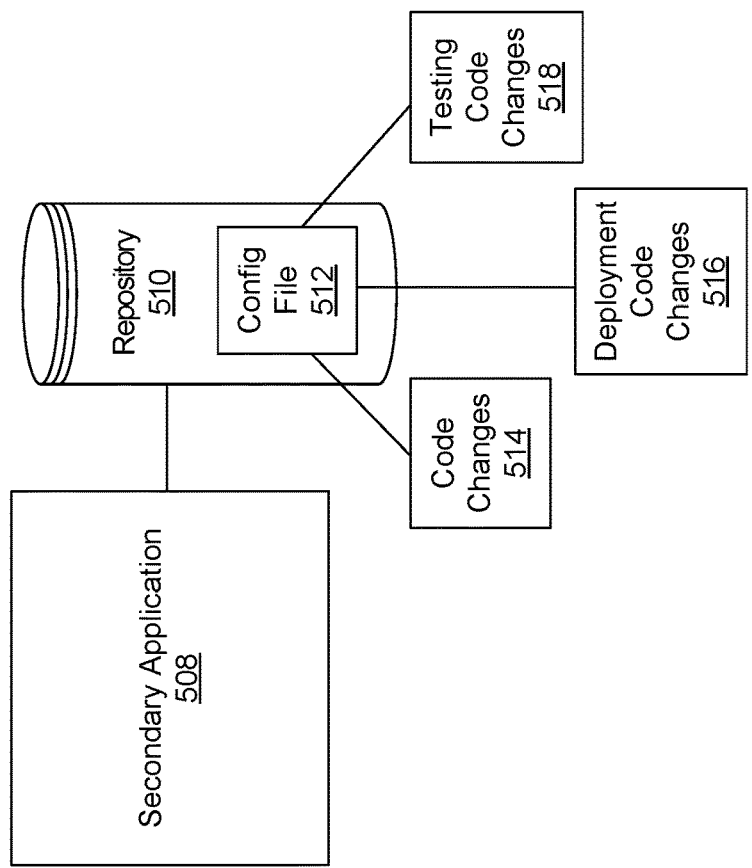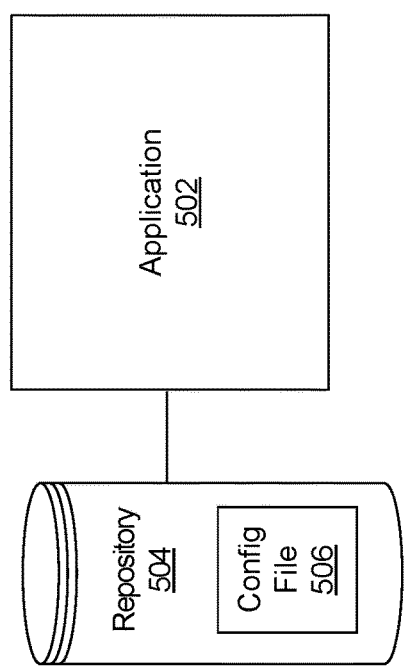
FIG. 5

```
1  module "executor_ad1" {
2    source = "./modules/app"
3    availability_domain = local.availability_domains[0]
4    services_compartment_id – local.compartment_id
5    regional_instances = local.regional_instances
6    worker_instances = local.worker_instances
7    log_namespaces = local.log_namespaces
8    app_type = "NON_PRODUCTION"
9    consumer = git submodule add https://example/sidecar_repository
10 }
```
← 602

TECHNIQUES FOR RESOLVING APPLICATION UPDATES

TECHNIQUES FOR RESOLVING APPLICATION UPDATES

The present application is a non-provisional application of, and claims the benefit and priority under 35 U.S.C. 119(e) of the following U.S. Provisional Applications, the entire contents of which are incorporated by reference for all purposes:

U.S. Provisional Application No. 62/963,335, filed Jan. 20, 2020, entitled "TECHNIQUES FOR DEPLOYING INFRASTRUCTURE RESOURCES WITH A DECLARATIVE PROVISIONING TOOL";

U.S. Provisional Application No. 62/963,413, filed Jan. 20, 2020, entitled "TECHNIQUES FOR DETECTING DRIFT IN A DEPLOYMENT ORCHESTRATOR";

U.S. Provisional Application No. 62/963,456, filed Jan. 20, 2020, entitled "USER INTERFACE TECHNIQUES FOR AN INFRASTRUCTURE ORCHESTRATION SERVICE";

U.S. Provisional Application No. 62/963,477, filed Jan. 20, 2020, entitled "TECHNIQUES FOR UTILIZING DIRECTED ACYCLIC GRAPHS FOR DEPLOYMENT INSTRUCTIONS";

U.S. Provisional Application No. 62/963,478, filed Jan. 20, 2020, entitled "TECHNIQUES FOR RESOLVING APPLICATION UPDATES";

U.S. Provisional Application No. 62/963,480, filed Jan. 20, 2020, entitled "TECHNIQUES FOR MANAGING DEPENDENCIES OF AN ORCHESTRATION SERVICE";

U.S. Provisional Application No. 62/963,452, filed Jan. 20, 2020, entitled "TECHNIQUES FOR ROLLBACK OF AN INFRASTRUCTURE ORCHESTRATION SERVICE";

U.S. Provisional Application No. 62/963,486 filed Jan. 20, 2020, entitled "TECHNIQUES FOR DEPLOYING INFRASTRUCTURE COMPONENTS IN PHASES";

U.S. Provisional Application No. 62/963,489, filed Jan. 20, 2020, entitled "TECHNIQUES FOR MANAGING LONG-RUNNING TASKS WITH A DECLARATIVE PROVISIONER";

U.S. Provisional Application No. 62/963,481, filed Jan. 20, 2020, entitled "TECHNIQUES FOR TRANSFERRING DATA ACROSS AIR GAPS"; and U.S. Provisional Application No. 62/963,491, filed Jan. 20, 2020, entitled "TECHNIQUES FOR PREVENTING CONCURRENT EXECUTION OF DECLARATIVE INFRASTRUCTURE PROVISIONERS".

BACKGROUND

Today, cloud infrastructure services utilize many individual services to provision and deploy code and configuration (respectively) across the cloud infrastructure service's many regions. These tools require significant manual effort to use, especially given that provisioning is generally declarative and deploying code is imperative. Additionally, as the number of service teams and regions grows, the cloud infrastructure service will need to continue to grow. Some cloud infrastructure service's strategies of deploying to a larger number of smaller regions includes per-region expenditures, which may not scale well.

BRIEF SUMMARY

Techniques are disclosed for resolving application updates in a deployment environment. In some embodiment, a computer-implemented method can include various operations. In some embodiments, the operations include, managing, by a computing system, a declarative infrastructure provisioner to deploy a plurality of infrastructure resources and a plurality of artifacts based at least in part on declarative instructions. The computing system detects a first modification to a first service. In some embodiments, the first service comprises at least one infrastructure resource of the plurality of infrastructure resources, and the first service utilizes a first distributed version-control repository for performing modifications to the first service. The computing system identifies that configuration data of a second service references the first service. The computing system detects a second modification to a second service. In some embodiments, the second service utilizes a second distributed version-control repository for performing modifications to the second service. In response to identifying the second modification to the second service and identifying that the second service references the first service, the computing system presents, via a graphical interface, changes comprising the first modification to the first service. The computing system receives user input indicating acceptance or rejection of the changes comprising the first modification to the first service. The computing system implements the changes to the first service according to the user input.

In other embodiments, a system is disclosed for resolving application updates in a deployment environment. The system may comprise one or more processors and one or more memories storing computer-executable instructions that, when executed by the one or more processors, configure the one or more processors to perform various operations. In some embodiments, the operations include, managing, by the system, a declarative infrastructure provisioner to deploy a plurality of infrastructure resources and a plurality of artifacts based at least in part on declarative instructions. The system detects a first modification to a first service. In some embodiments, the first service comprises at least one infrastructure resource of the plurality of infrastructure resources, and the first service utilizes a first distributed version-control repository for performing modifications to the first service. The system identifies that configuration data of a second service references the first service. The system detects a second modification to a second service. In some embodiments, the second service utilizes a second distributed version-control repository for performing modifications to the second service. In response to identifying the second modification to the second service and identifying that the second service references the first service, the system presents, via a graphical interface, changes comprising the first modification to the first service. The system receives user input indicating acceptance or rejection of the changes comprising the first modification to the first service. The system implements the changes to the first service according to the user input.

In other embodiments, a computer-readable storage medium is disclosed that may store computer-executable instructions that, when executed by one or more processors, cause the one or more processors to perform various operations. In some embodiments, the operations include, managing a declarative infrastructure provisioner to deploy a plurality of infrastructure resources and a plurality of artifacts based at least in part on declarative instructions. The operations further include detecting a first modification to a first service. In some embodiments, the first service comprises at least one infrastructure resource of the plurality of infrastructure resources, and the first service utilizes a first distributed version-control repository for performing modifications to the first service. The operations further include identifying that configuration data of a second service references the first service. The system detects a second modification to a second service. In some embodiments, the second service utilizes a second distributed version-control repository for performing modifications to the second service. The operations further comprise, in response to identifying the second modification to the second service and identifying that the second service references the first service, presenting, via a graphical interface, changes comprising the first modification to the first service. The operations further comprise receiving user input indicating acceptance or rejection of the changes comprising the first modification to the first service. The operations further comprise implementing the changes to the first service according to the user input.

BRIEF DESCRIPTION OF DRAWINGS

To easily identify the discussion of any particular element or act, the most significant digit or digits in a reference number refer to the figure number in which that element is first introduced.

FIG. 5 is a schematic diagram illustrating utilization of respective repositories of an application and a secondary application, according to at least one embodiment.

FIG. 6 illustrates an example of code of one application including a reference to a data repository of another application, according to at least one embodiment.

DETAILED DESCRIPTION

Figure 1:
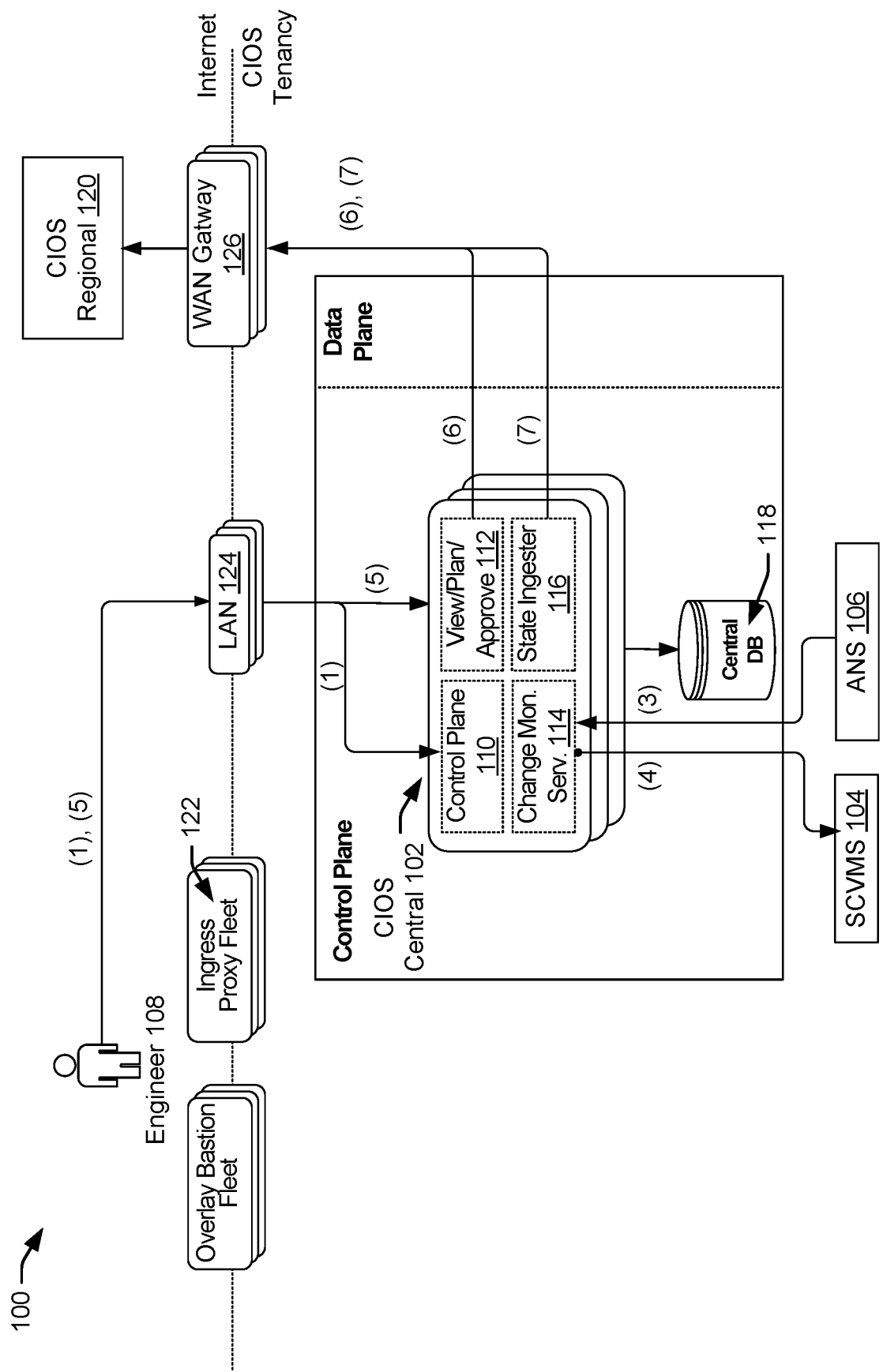
FIG. 1 is a block diagram of an architecture for implementing at least some elements of a cloud infrastructure orchestration service, according to at least one embodiment.

In some examples, infrastructure as a service (IaaS) is one particular type of cloud computing. IaaS can be configured to provide virtualized computing resources over a public network (e.g., the Internet). In some examples, IaaS is one of the three main categories (or sub-categories) of cloud computing services. Most consider the other main categories to be software as a service (SaaS) and platform as a service (PaaS), and sometimes SaaS may be considered a broader category, encompassing both PaaS and IaaS, with even some considering IaaS to be a sub-category of PaaS as well.

In an IaaS model, a cloud computing provider can host the infrastructure components (e.g., servers, storage devices, network nodes (e.g., hardware), deployment software, platform virtualization (e.g., a hypervisor layer), or the like).

In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) in each VM, deploy middleware, such as databases, create storage buckets for workloads and backups, and install even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., selling) IaaS. An entity might also opt to deploy a private cloud, becoming its own provider of infrastructure services.

In some examples, IaaS deployment is the process of putting a new application, or a new version, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

As noted above, one way to provision the infrastructure is to describe it declaratively. As such, the configuration file may be a declarative file that merely describes each of the infrastructure components noted above and how they interact. The configuration file can describe the resource and the relevant fields needed to create the element, and then as other elements can be described that reference the previously described elements. In some examples, a provisioning tool can then generate a workflow for creating and managing the elements that are described in the configuration file.

In some instances, the workflow of the provisioning tool may be configured to perform various commands. One function that can be performed is view reconciliation, where the provisioning tool can compare the view of the current infrastructure (e.g., the expected state of the infrastructure) with how the infrastructure is actually running. In some instances, performing the view reconciliation function may include querying various resource providers or infrastructure resources to identify what resources are actually running. Another function that the provisioning tool can perform is plan generation, where the provisioning tool can compare the actually running infrastructure components with what the provisioning tool wants the state to look like (e.g., the desired configuration). In other words, the plan generation function can determine what changes need to be made to bring the resources up to the most current expectations. In some instances, a third function is the execution (e.g., apply) function, where the provisioning tool can execute the plan generated by the plan generation function.

In general, provisioning tools may be configured take the configuration file, parse the declarative information included therein, and programmatically/automatically determine the order in which the resources need to be provisioned in order to execute the plan. For example, if the VPC needs to be booted before the security group rules and VMs are booted, then the provisioning tool will be able to make that determination and implement the booting in that order without user intervention and/or without that information necessarily being included in the configuration file.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

As noted above, generally there are two different tools used to handle each of the provisioning of infrastructure resources and the deployments of code to control the infrastructure resources, with orchestration between the two tools being performed manually. However, at scale, manual implementation always leads to deviations. Thus, an automated tool that can both provision and deploy a virtual infrastructure enables more efficient and reliable techniques for implementing a virtual cloud environment.

In some examples, when two tools are used, issues can arise when a user manually makes changes to the code between the provisioning phase and the deployment phase. As described herein, a technique that uses a single tool for both provisioning and deploying can alleviate that by automating the process, such that there isn't an opportunity for manual code changes. It may be the case, that a slight change to the way in which one user codes something, can create major issues in the deployment phase. In some examples, the first time an operator performs an action in a new region (e.g., a typo in the code), the object that was coded with the typo may be that way forever. If the application is deployed with that typo, and the application is not sensitive to that typo (e.g., it still works), it is possible that some time down the road, an additional code change could become sensitive to that typo, and crash the entire system. Thus, the techniques provided herein can remove the gap between provisioning and deployment that can often lead to problems.

In general, modeling deployments is declarative such that a configuration file can be used to declare the infrastructure resources. For example, create, read, update, delete (CRUD) instructions are generally used to generate deployment files using general Representational State Transfer (REST) concepts (e.g., REST Application Programming Interfaces (APIs)). However, deployment itself doesn't generally follow the same concept. Additionally, while the infrastructure provisioning tools tend to be really powerful and/or expressive, the tools for deployment tend to be much more restrictive regarding the operations they can perform (e.g., they are imperative as opposed to declarative). Thus, there has been a long-felt need for a tool that can handle both functional requirements (e.g., provisioning and deployment of infrastructure elements) within a cloud environment.

In some examples, techniques for implementing a cloud infrastructure orchestration service (CIOS) are described herein. Such techniques, as described briefly above, can be configured to manage both provisioning and deploying of infrastructure assets within a cloud environment. In some instances, the CIOS can include two classes of service: the Central and Regional components (e.g., CIOS Central and CIOS Regional). The following terms will be used throughout:

Infrastructure component—A long-lived piece of infrastructure that supports running code.
  Examples: a deployment application, a load balancer, a domain name system (DNS) entry, an object storage bucket, etc.
Artifact—Code being deployed to a deployment application or a Kubernetes engine cluster, or configuration information (hereinafter, "config") being applied to an infrastructure component. These may be read-only resources.
Deployment task—A short-lived task that is often associated with deploying or testing code. Additionally, the deployments tasks are modeled as resources that live no longer than the release that creates them.

Examples: "deploy $artifact to $environment," "watch $alarm for 10 minutes," "execute $testSuite," or "wait for $manualApproval"

For example, CIOS can model a deployment orchestrator deployment as the creation of a resource that transitions to the Available state when it completes.

Because CIOS maintains the state of its cloud infrastructure service declarative provisioner, CIOS can control the lifecycle of these short-lived resources as it relates to releases.

Resource—a CRUD'able resource.

CIOS models each of the constructs listed above as a resource. The next section discusses this modeling in detail.

Flock—CIOS's model encapsulating a control area and all its components. Exists primarily to model ownership of and point at the infrastructure components.

Flock config—Describes the set of all infrastructure components, artifacts, and deployment tasks associated with a single service.

Each Flock has exactly one Flock config. Flock configs are checked in to source control.

Flock configs are declarative. They expect CIOS to provide realm, region, ad, and artifact versions as input.

Flocks are granular—a Flock consists of a single service and supporting infrastructure.

State—A point-in-time snapshot of the state of every resource in the flock.

Release—A tuple of a specific version of a flock config and a specific version of every artifact that it references. Think of a release as describing a state that may not yet exist.

Release plan—The set of steps that the CIOS would take to transition all regions from their current state to the state described by a release.

Release plans have a finite number of steps and a well-defined start and end time.

Apply—This is a noun. A single attempt to execute a Release plan. An Execution changes the current State of the Flock.

CIOS can be described as an orchestration layer that applies configuration to downstream systems (e.g., world-wide). It is designed to allow world-wide infrastructure provisioning and code deployment with no manual effort from service teams (e.g., beyond an initial approval in some instances). The high level responsibilities of CIOS include, but are not limited to:

Providing teams with a view in to the current state of resources managed by CIOS, including any in-flight change activity.

Helping teams plan and release new changes.

Coordinating activity across various downstream systems within a region to execute approved release plans with no human intervention.

Coordinating activity across regions/realms to execute approved release plans world-wide.

In some examples, CIOS handles onboarding by enabling teams to provide CIOS with configuration information via checked-in code. Additionally, CIOS can automate more things, so this is a heavier-weight exercise than in previous implementations. In some instances, CIOS handles pre-deployment by offering teams the ability to automatically deploy and test code. In some instances, CIOS can handle the writing of change management (CM) policy by enabling automatically generating plans to roll out new artifacts (e.g., world-wide) when a team builds them. It can do this by inspecting the current state of each region and the current CIOS config (which, can itself be an artifact). Additionally, teams can inspect these plans, and may iterate on them by changing the CIOS config and asking CIOS to re-plan. Once the team is satisfied with a plan, they can create a "release" that references the plan. The plan can then be marked as approved or rejected. While teams can still write CMs, they are just pointers to the CIOS plan. Thus, teams can spend less time reasoning about the plan. Plans are more accurate because they are machine generated. Plans are almost too detailed for human consumption; however, it can be displayed via a sophisticated user interface (UI).

In some examples, CIOS can handle execution of CMs by automatically executing the deployment plan. Once release plan has been created and approved, engineers no longer participate in CMs unless CIOS initiates roll-back. In some cases, this may require teams to automate tasks that are currently manual. In some examples, CIOS can handle rolling back a change management (CM) by automatically generating a plan that returns the flock to its original (e.g., pre-release) state when CIOS detects service health degradation while executing. In some examples, CIOS can handle deploying emergent/tactical changes by receiving a release plan that is scoped to a subset of regions and/or a subset of the resources managed by CIOS, and then executing the plan.

Additionally, CIOS may support primitives necessary to define fully automated world-wide deployments. For example, CIOS can measure service health by monitoring alarms and executing integration tests. CIOS can help teams quickly define roll-back behavior in the event of service degradation, then can execute it automatically. CIOS can automatically generate and display release plans and can track approval. In some instances, the language that teams use to describe desired deployment behavior may be declarative. CIOS can combine the functionality of code deployment and infrastructure config (e.g., provisioning) in one system. CIOS also supports flexible ordering across regions, and across components within a region. Teams can express ordering via checked-in config. Teams may call CIOS's planning and release APIs programmatically.

FIG. 1 depicts an architecture 100 for illustrating techniques for implementing at least CIOS Central 102. In some examples, CIOS Central 102 can be the service that handles operations at the level of a "Flock." CIOS Central 102 has a few responsibilities, including but not limited to:

Serving as an authentication gateway for Flock metadata changes and release operations.

Storing an authoritative mapping of Flock metadata to the deployment artifacts and CIOS repositories for the flock.

Coordinating global Releases across Phases and Targets.

Synchronization to enforce policies like "no more than one ongoing release to a Flock at a time."

Detecting changes to Flock configuration (config) and artifacts, and triggering a release generation on such changes.

In some examples, a source code version-control management service (SCVMS) 104 can be configured to store authoritative Flock configuration and an artifact notification service (ANS) 106 can be subscribed to by CIOS Central 102, so that CIOS Central 102 can be informed of new artifact builds. The CIOS Central 102 can then map incoming changes against the affected flocks, and initiate release planning where desired. Additionally, in some examples, an artifact push service (APS) can be invoked by CIOS Central 102, before a release to a target, to ensure any artifacts required for a successful release are present in the target's region ahead of release.

In some examples, customers (e.g., engineers) 108 can call CIOS Central 102 to CRUD flocks and/or releases, and to view the status of ongoing CIOS activity. Flock management service 110 can include one or more API's to manipulate flocks, view/plan/approve service 112 can include CRUD API's to create and approve plans, and to view a central copy of the state of all CIOS-managed resources, change monitoring service 114 can watch SCVMS 104 for changes to flock config, and can receive notifications about changes to other artifacts from ANS 106, and state ingester service 116 can create copies of regional state in CIOS Central database (DB) 118 so that view/plan/approve 112 can expose them. In some examples, the CIOS Central DB 118 can be a DB of flocks, plans, and state. Flock information can be authoritative; while everything else may be a stale copy of data from CIOS Regional 120. CIOS Central 102 may be configured to provide any suitable portion and/or number of user interfaces (e.g., user interfaces 500-800) for presenting any suitable data related to a flock, a release, an infrastructure component, an artifact, or the like. In some embodiments, CIOS Central 102 may present via any suitable interface data related to one or more releases. A release may include any suitable combination of tasks related to one or more infrastructure components and/or one or more code changes to one or more applications (e.g., artifacts). Some examples of the user interfaces provided by CIOS Central 102 are described below with respect to FIGS. 5-13.

In some examples, engineer 108 can perform an API call for the flock management service 110 (e.g., through the ingress proxy fleet 122) to create a list of flocks. The protocol for making such an API call can be hypertext transport protocol secure (HTTPS) or the like. Relevant access control lists (ACLs) for this operation can include a local area network (LAN) 124 or other private connection. For example, CIOS may manage/control a network-connectivity alternative to using the public Internet for connecting a customer's on-premises data center or network with CIOS (e.g., a dedicated, leased, and/or private connection). Additionally, authentication and authorization (e.g., of the engineer 108) may be performed by a reservation system portal that allows users to manage machine infrastructure (e.g., reservation service). In some instances, CIOS Central 102 can store flock metadata, plans, and state in the Central DB 118, using Java database connectivity (JDBC) or the like. In some examples, ANS 106 can be configured to notify the change monitoring service 114 when new artifacts have been published. The ANS 106 may use HTTPS, and both authentication and authorization may be handled by a mutual transport layer security service. Additionally, in some instances, the change monitoring service 114 can poll the SCVMS 104 for flock configuration changes. This polling can be performed using secure shell (SSH) or other protocols. Authentication of the change monitoring service 114 may be handled by a CIOS system account and authorization may be handled by SCVMS 104.

In some examples, the engineer 108 can use the view/plan/approve service 112 to do one or more of the following operations. The engineer 108 can plan and/or approve by calling CIOS Central 102 to generate and approve plans. The engineer 108 can view by calling CIOS Central 102 to view the status of ongoing CIOS activity world-wide. Additionally, the engineer 108 can CIOS Central 102 to view a replica of the state of CIOS-managed resources world-wide. These API calls (or the like) can be performed via the HTTPS protocol or similar protocols. Additionally, relevant ACLs can be controlled by LAN 124, and both authentication and authorization can be handled by the reservation service. In some examples, the view/plan/approve service 112 can request planning and push plan approval to all regions of CIOS Regional 120 (e.g., using HTTPS or the like). Relevant ACLs can be controlled using a security list managed by the wide area network (WAN) gateway 126. Authentication can be handled by mutual transport layer security and authorization can be handled by various identity policies. Further, the state ingester service 116 can watch CIOS Regional 120 for job status or state changes, so that CIOS can provide a central view of them upon request (e.g., also using HTTPS or the like). ACLSs for this can also be handled by the WAN gateway 126, and both authentication and authorization can be handled by mutual transport layer security services.

Figure 2:
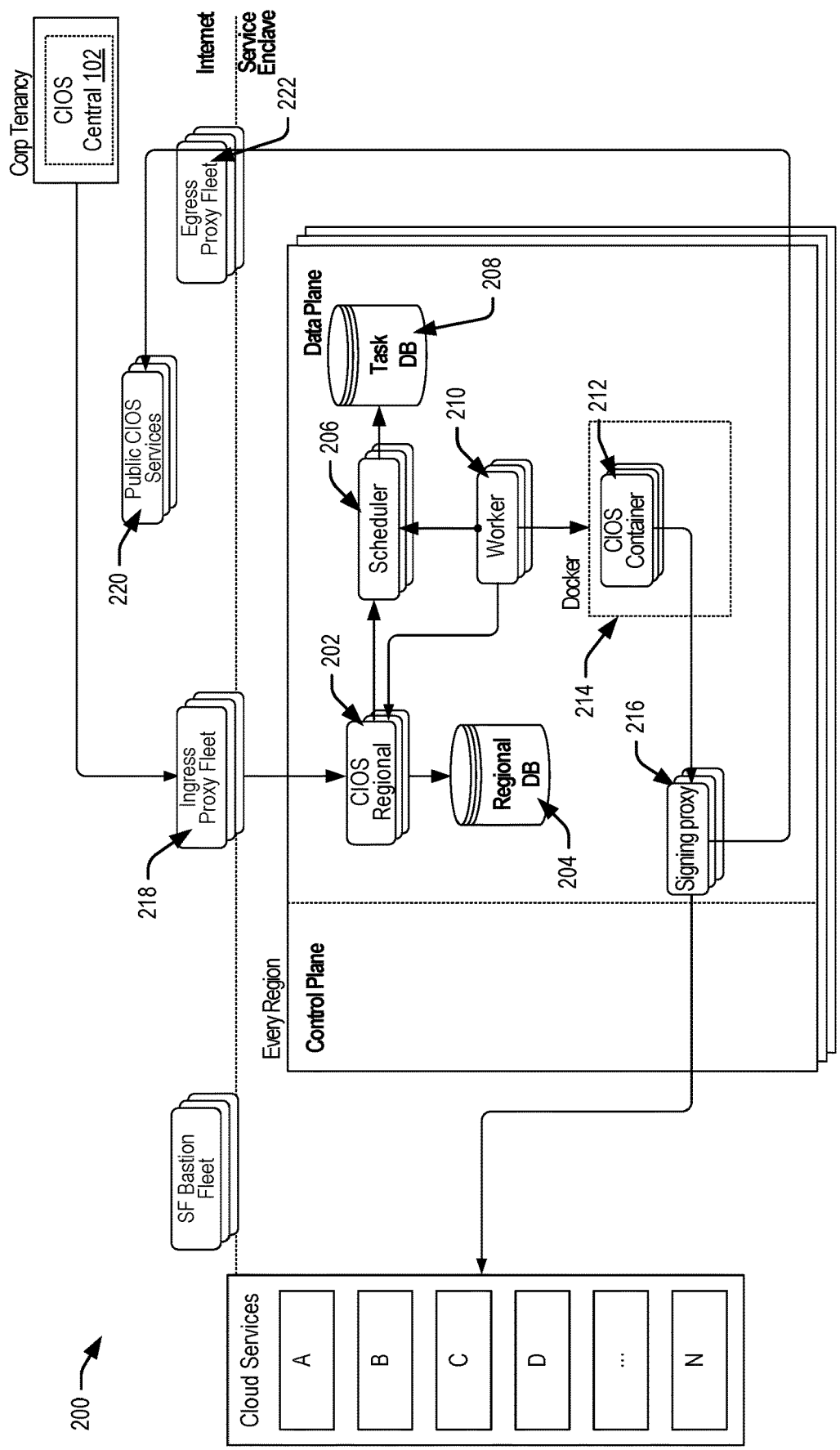
FIG. 2 is a block diagram of an architecture for implementing at least some elements of a cloud infrastructure orchestration service, according to at least one embodiment.

FIG. 2 depicts an architecture 200 for illustrating techniques for implementing at least CIOS Regional 202. In some examples, CIOS Regional 202 is where much of the work of declarative provisioning and planning, as well as approved release application can occur. In some instances, each instance of CIOS Regional 202 may have a regional fronted that can handle operations at the level of "Execution Targets." It can be configured to perform the following:

Handling all CIOS Authentication for incoming operations from CIOS Central 102.

Enforcing a rule that only one "execution" (plan/import resources/apply plan) can be ongoing for a given Execution target at a time.

Managing binary artifact storage for declarative provisioning artifacts used for input and output during declarative infrastructure provisioning execution. Examples of input are declarative infrastructure provisioning configuration files and an input state file. Typical output is a final state file.

Requesting work from and polls for results from the CIOS Executor for any given execution.

In some instances, the CIOS Frontend may be dependent on a CIOS Executor 206 (also referred to herein as a "scheduler"), which can handle the actual execution. The CIOS Executor, in some examples, operates at the level of "Execution," and it can:

Track a pool of available Worker nodes

Query incoming job requests, and assigns them to eligible workers as available

Track worker status and Execution updates for reporting to clients

Detect dead nodes via a leasing protocol, and can fail tasks assigned to dead nodes, depending on task status.

Provide facilities to cancel/kill/pause/resume Executions, and can map those onto facilities to pass cancellation/kill/resumption info on to Worker nodes.

In some instances, the CIOS Executor can depend on CIOS Workers, which can assign tasks for execution to Workers, and provide a facility for Workers to update job progress. The worker service operates at the granularity of "Task." Each worker is an agent executing Tasks assigned to that worker and reporting Task status and output. Each worker can:

Poll Executor Worker APIs for assigned work items, and take action to make the assign state match its local state:

start containers for polls task items that do not exist locally kill containers for locally running containers that have no corresponding assigned task item Report status for jobs Stage input and output for job container execution Launch and monitor declarative infrastructure provisioning containers for doing the real work of a Release for an Execution Target.

CIOS Workers may depend on CIOS Executor to poll work from and report results to the worker endpoint of the CIOS Executor. The Worker may rely on the Executor for all coordination. Additionally, the CIOS Workers may also depend on CIOS Regional 202, where the Worker services reads input from and writes output to one or more APIs that are associated with the Regional Frontend service. Examples of input are configuration and starting state files and import mappings. Examples of output are declarative provisioning process, output declarative provisioning state files, and import result states.

In some examples, CIOS Regional 202 can be a regional service for managing regional instances/deployments of CIOS. CIOS Regional 202 covers responsibility for authoritatively storing and managing plans and stat that pertains to a particular region. A Regional DB 204 may be a CIOS DB for the state and plans in the particular region. This is the authoritative copy of the region's subset of the Central DB 118 of FIG. 1. Scheduler 206 can be responsible for managing worker fleet capacity, assigning tasks to workers, and keeping track of task state. In some instances, Task DB 208 is another CIOS DB for task state. Data in this DB is mostly for operational purposes. Additionally, Worker 210 can be a fleet of java virtual machines (JVMs) that manage declarative provisioning images. These receive instructions from the Scheduler 206 and communicate results to both the Scheduler 206 and CIOS Regional 202. A CIOS container 212 can run declarative provisioning actions in its own private docker 214 container. This container does not need to contain secrets. Additionally, in some examples, a signing proxy 216 can be configured to prevent secret exfiltration via a declarative provisioning tool, in order to avoid putting secrets in the declarative provisioning Image. Instead, CIOS can perform request signing or initiate a mutual transport layer security (mTLS) service in a proxy. This also makes it easier to use FIPS-compliant crypto libraries.

In some examples, CIOS Central 102 can call CIOS Regional 202 to create plans, push approvals, watch job status (service principal), and extract declarative provisioner state (service principal). An ingress proxy 218 can be configured as the ACL and various identity policies may be used for both authentication and authorization. Alternatively, in some examples, the ingress proxy 218 may be replaced with a load balancer configured to balance the load incoming requests, plans, etc. In some instances, CIOS Regional 202 may run a declarative provisioner by asking the scheduler 206 to do so. Worker 210 can ask Scheduler 206 what it should be running, and can report status to Scheduler 206 when done. In some cases, mTLS may handle both authentication and authorization for CIOS Regional 202 and Worker 210. Additionally, when Worker 210 needs to run a declarative provisioner, it does so in docker containers by interacting with the local docker 214. Authentication for this stage may be handled by a local unix socket. A docker protocol may be used for this last step; however, HTTPS may be utilized for the previous ones.

In some embodiments, CIOS Regional 202 may be configured to provide any suitable portion and/or number of user interfaces (e.g., user interfaces 500-800) for presenting any suitable data related to a flock, a release, an infrastructure component, an artifact, or the like. In some embodiments, CIOS Regional 202 may present via any suitable interface data related to one or more releases. A release may include any suitable combination of tasks related to one or more infrastructure components and/or one or more code changes to one or more applications (e.g., artifacts). Some examples of the user interfaces provided by CIOS Regional 202 are described below with respect to FIGS. 5-13.

In some examples, the CIOS container 212 enables a declarative provisioner to interact (via API) with the signing proxy 216, while the declarative provisioner thinks it's calling various CIOS services. The signing proxy 216 listens on one ephemeral port per calling instance of declarative provisioner, known only to that declarative provisioner. The signing proxy 216 can initiate requests signatures or mTLS, and can pass the declarative provisioner's calls through to other CIOS services within the service enclave. In some instances, the signing proxy 216 can also communicate with one or more public CIOS services 220. For example, the Signing Proxy 216 will use the internal endpoint of public services where possible. For services with no internal endpoint, it must use the egress proxy 222 to reach the external endpoint. This use of the signing proxy 216 may not be for cross-region communication; for example, an egress proxy whitelist in each region may only be for that region's public IP ranges. In some examples, Worker 210 may then persist state and logs from a declarative provisioner in CIOS Regional 202 so that they can be exfiltrated to CIOS Central 102.

Using CIOS, there are a few phases of a representative customer experience: onboarding, pre-release, world-wide release, and tactical release. For the pre-release phase, the below is an example of what happens between a new artifact being built and releasing artifacts to release one (e.g., R1). This should replace some or most of current change management processes. As relevant artifacts are built, CIOS can automatically generate releases using "the latest version of everything in the flock." A release is a specific version of the flock config with specific inputs (e.g. artifact versions, realm, region, and ad). A release contains one roll-forward plan per region and metadata describing region ordering. Each regional plan is the set of operations a declarative provisioner would take to realize the flock configuration in that region. Teams with pre-release environments can use CIOS to automatically release and test software in said environments. Teams can configure CIOS to automatically test the roll-back plan. Teams will be able to inspect and approve releases through the CIOS UI. Teams can approve some but not all of the regional plans within a release. If "the latest version of everything" yielded no suitable plans, teams can ask CIOS to generate a plan for cherry-picked artifact versions.

For the world-wide release phase, the below is an example of how a team executes tomorrow's version of today's "normal CM." Once a release is approved, CIOS pushes each approved regional plan to the respective region. CIOS acts independently within each region to apply approved plans. CIOS will only perform the set of actions explicitly described in that region's plan. Instead of "thinking independently," it will fail. CIOS UI shows teams the progress of the execution. CIOS UI prompts teams when manual approvals are required. If execution fails because of an outage in CIOS or in a downstream service, CIOS can notify the team and can prompt them for next steps (e.g., abort, retry). CIOS does perform retries, but some downstream system outages will exceed its willingness to retry. If execution fails because of service health degradation or a test failure, CIOS will assist teams with rolling the flock back to its starting state. CIOS will notify (e.g., page) teams when it initiates automatic rollback. Teams must approve the rollback plan, then CIOS will execute it.

For the tactical release phase, the below is an example of how a team can execute tomorrow's version of an "emergent CM." When generating a plan, teams may ask CIOS to target the plan at specific resources in several ways: topologically (e.g., realm, region, AD, etc.), by resource type (e.g., "only metrics configs" or "only deployment orchestration service deployments", etc.), or combinations of the above (e.g., in a disjunctive manner). Teams approve tactical releases just like world-wide releases. CIOS orchestrates them similarly. If a team needs to deploy a tactical release while there is an active a world-wide release, CIOS will stop executing the world-wide release in the targeted regions, then start executing the tactical release.

In some examples, a declarative provisioner's state (e.g., traditionally a file) is an authoritative record of the set of resources managed by the declarative provisioner. It contains the mapping between the logical identifier of each resource from the configuration file and the actual identifier of the resource. When the declarative provisioner is creating a resource, certain kinds of failure can prevent the actual identifier from being recorded in the state. When this happens, the actual identifier is lost to the declarative provisioner. These can be called "orphaned resources."

For most resources, orphans represent waste—the declarative provisioner launched (for example) an instance that it forgot about, but will launch another instance instead the next time it is run. For resources with uniqueness constraints or client-supplied identifiers, orphans prevent the declarative provisioner from making forward progress. For example, if the declarative provisioner creates a user 'nglass' and a failure orphans it, the next run of the declarative provisioner will attempt to create 'nglass' and fail because a user with that username already exists. In some cases, orphans are only a problem when adding new resources to the state. In some instances, the declarative provisioner's refresh behavior may naturally recover from failures to record updates and deletions.

CIOS needs to be robust in the event of downstream service outages or outages of CIOS itself. Because CIOS can leverage a declarative provisioner to apply changes, this means there should be robustness around running the declarative provisioner and maintaining the declarative provisioner state. The declarative provisioner providers perform 'small scale' retries—enough to avoid outages lasting for small numbers of minutes. For example, a cloud provider will retry for up to 30 minutes. Downstream system outages lasting longer than 30 minutes will cause the declarative provisioner to fail. When the declarative provisioner fails, it records all changes it successfully made in the state, then exits. To retry, CIOS must re-execute the declarative provisioner. Re-executing the declarative provisioner also allows CIOS to retry in the event of a failure in CIOS itself. In some instances, CIOS can run the following operations in a loop:

Refresh—the declarative provisioner calls GET APIs to retrieve a fresh snapshot of every resource described in its state.

Plan—the declarative provisioner generates a plan (a concrete set of API calls) that will realize the desired state, given the recently-refreshed current state.

Apply—the declarative provisioner executes the set of steps in the plan.

CIOS may always run all three of these steps when executing the declarative provisioner. The refresh operation helps recover from any updates or deletions that weren't recorded. CIOS inspects the result of the plan operation and compares it to the approved release plan. If the newly generated plan contains operations that were not in the approved release plan, CIOS may fail and may notify the service team.

Figure 3:
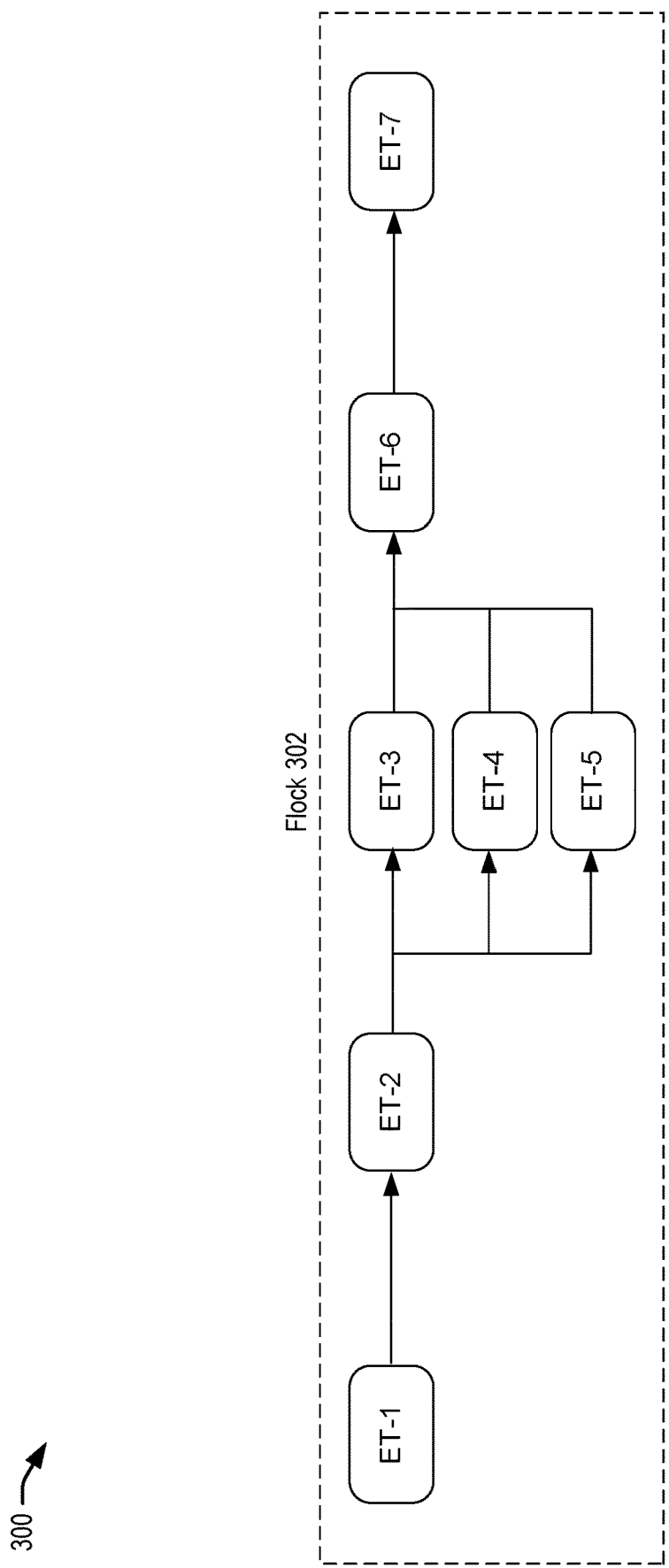
FIG. 3 is a flow diagram for illustrating an example flock, according to at least one embodiment.

FIG. 3 depicts a directed acyclic graph (DAG) 300 for illustrating an example flock 302. The progression of code/config from check-in to production, for a single flock config in CIOS, can be described all the way from the first testing deployment to the last prod deployment. Internally, CIOS calls each element in the progression an Execution Target (ET)—this is all over our internal APIs, but does not leak out in to the flock config. CIOS executes ETs based on the DAG 200 defined in the flock config. Each ET (e.g., ET-1, ET-2, ET-3, ET-4, ET-5, ET-6, and ET-7) is, roughly, one copy of the service described by the flock config.

Figure 4:
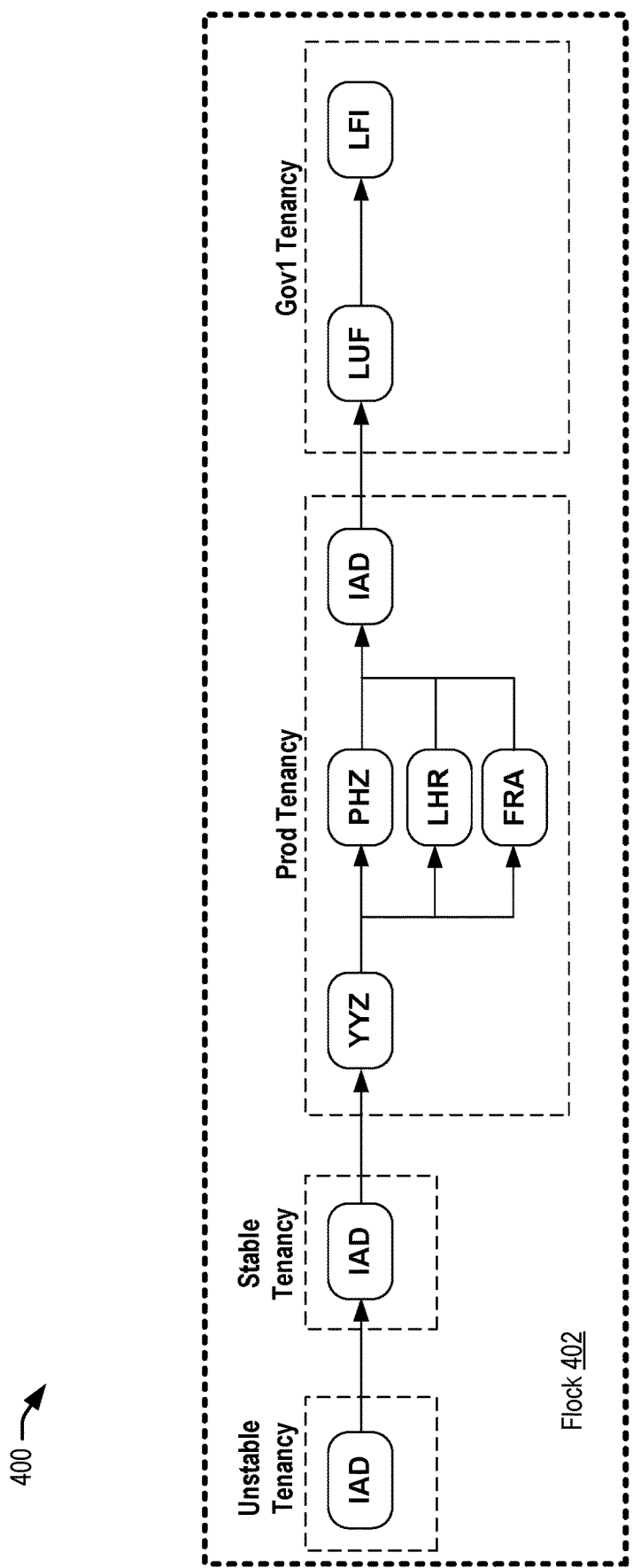
FIG. 4 is a flow diagram for illustrating an example flock, according to at least one embodiment.

FIG. 4 depicts a DAG 400 for illustrating and example flock 402. In the flock config, CIOS is very opinionated about how teams express this progression—they must model it using cloud infrastructure tenancies and regions. Teams should not model progression using realms. CIOS allows teams to use many tenancies within a realm and many regions within a tenancy. However, CIOS does not allow teams to use the same region twice within a tenancy (though they may use the same region twice within a realm—in different tenancies). DAG 400 illustrates a version of DAG 300 from FIG. 3, expressed with tenancies and regions. This example is for an overlay service, where pre-prod ETs are in a prod region. A service enclave service would have the unstable and stable tenancies in release one. In DAG 400, IAD is a regional airport code for Dulles airport in Washington, D.C., YYZ is a regional airport code for Toronto, Ontario, PHX, LHR, and FRA, are regional airport codes for Phoenix, London, and Frankfurt, respectively, and LUF and LFI are for two different air force bases.

In one embodiment, CIOS and/or other techniques described herein are an improvement on each of Terraform (a declarative provisioning tool), Tanden (a code generation tool), and the Oracle Deployment Orchestrator (ODO). Additionally, in some examples, CIOS and/or other techniques described herein can be implemented using at least portions of the Terraform, Tanden, and ODO tools.

FIG. 5 is a schematic diagram illustrating utilization of respective repositories of an application (e.g., application 502) and a secondary application (e.g., sidecar application 508), according to at least one embodiment. By way of example, application 502 may utilize repository 504 for storing any suitable combination of one or more configuration files (e.g., configuration file 506). Repository 504 may be a data structure that stores metadata for a set of files or directory structure (e.g., a set of files associated with the application 502). In some embodiments, the repository 504 may be managed by source code version-control management service (SCVMS) 104 of FIG. 1. The SCVMS 104 may be an example of a version control system such as a Git repository (or another suitable distributed or centralized version-control system and/or software). Some of the metadata contained by repository 504 can include, among other things, historical records of changes in the repository 504, a set of committed objects, a set of references to committed objects, etc. The configuration file 506 (also referred to as "config file 506", for brevity) can be one or more files used to configure parameters and initial settings for application 502. In some embodiments, the config file 506 may include any suitable combination of parameters, settings, deployment code, and/or code for testing application 502.

In some embodiments, sidecar application 508 is a supporting process or service that is deployed with the application 502. Sidecar application 508 may utilize repository 510 for storing any suitable combination of one or more configuration files (e.g., configuration file 512). Repository 510 may be a data structure that stores metadata for a set of files or directory structure (e.g., a set of files associated with the application 502). In some embodiments, the repository 510 may also be managed by source code version-control management service (SCVMS) 104 of FIG. 1 (or another version control software and/or system). The configuration file 512 (also referred to as "config file 512", for brevity) can be one or more files used to configure parameters and initial settings for sidecar application 508. In some embodiments, the config file 512 may include any suitable combination of parameters, settings, deployment code, and/or code for testing application 502. In some embodiments, changes may be made to either (or both) configuration files (e.g., config file 512). These changes may include any suitable combination of configuration code changes (e.g., code changes 514, changes made to one or more configuration files of sidecar application 508), deployment code changes 516 (e.g., changes to the code for deploying sidecar application 508), and/or testing code changes 518 (e.g., changes to the code for testing sidecar application 508).

According to some embodiments, application 502 may rely on data and/or functionality provided by sidecar application 508. Conventionally, if changes 514-518 exist, updates would need to be manually made affect the manner in which the sidecar application 508 was deployed in various environment. The changes 514-518 would not be automatically detected and/or applied. This can cause a variety of problems in a deployment if application 502 depends on data and/or functionality provided by sidecar application 508. When changes 514-518 are not applied (e.g., when a deployment is utilizing an older version of the sidecar application 508) the data and/or functionality provided by that unaltered version of the sidecar application 508 may be inaccurate, broken, or otherwise unavailable/untrustworthy.

To rectify this issue, the config file 506 of repository 504 may include a reference to the config file 512 of repository 510. FIG. 6 illustrates an example of code segment 600 of one application (e.g., application 502) including a reference to a data repository of another application, according to some embodiments. As discussed above, the repository 504 and the repository 510 of FIG. 5 may be separate repositories used to store respective code associated with the application 502 and sidecar application 508. These repositories may be maintained (e.g., by SCVMS 104 of FIG. 1) separately and changes to one may not affect the other. However, in instances in which one application (e.g., application 502) may rely on data and/or functionality corresponding to another application (e.g., sidecar application 508), a reference (e.g., statement 602) may be placed in code associated with an application (e.g., application 502) that references another repository (e.g., repository 510 of FIG. 5).

In some embodiments, statement 602 may reference a Git submodule (e.g., utilizing statement 602). A git submodule is a record within a host git repository (e.g., repository 504 of FIG. 5) that points to a specific commit in another external repository (e.g., repository 510 of FIG. 5). When adding a submodule to a repository (e.g., using the statement 602) a new .gitmodules files will be created that contains metadata about the submodule. When statement 602 is executed, SCVMS 104 may clone the submodule such that the current state of the repository (e.g., the repository 510) may be ascertained. From the current state of the repository, it may be identified that any suitable combination of code changes (e.g., code changes 514, deployment code changes 516, and/or testing code changes 518 of FIG. 5) exist. These changes may be utilized when deploying application 502 and sidecar application 508 such that a current version of code of the sidecar application 508 may be utilized.

Figure 7:
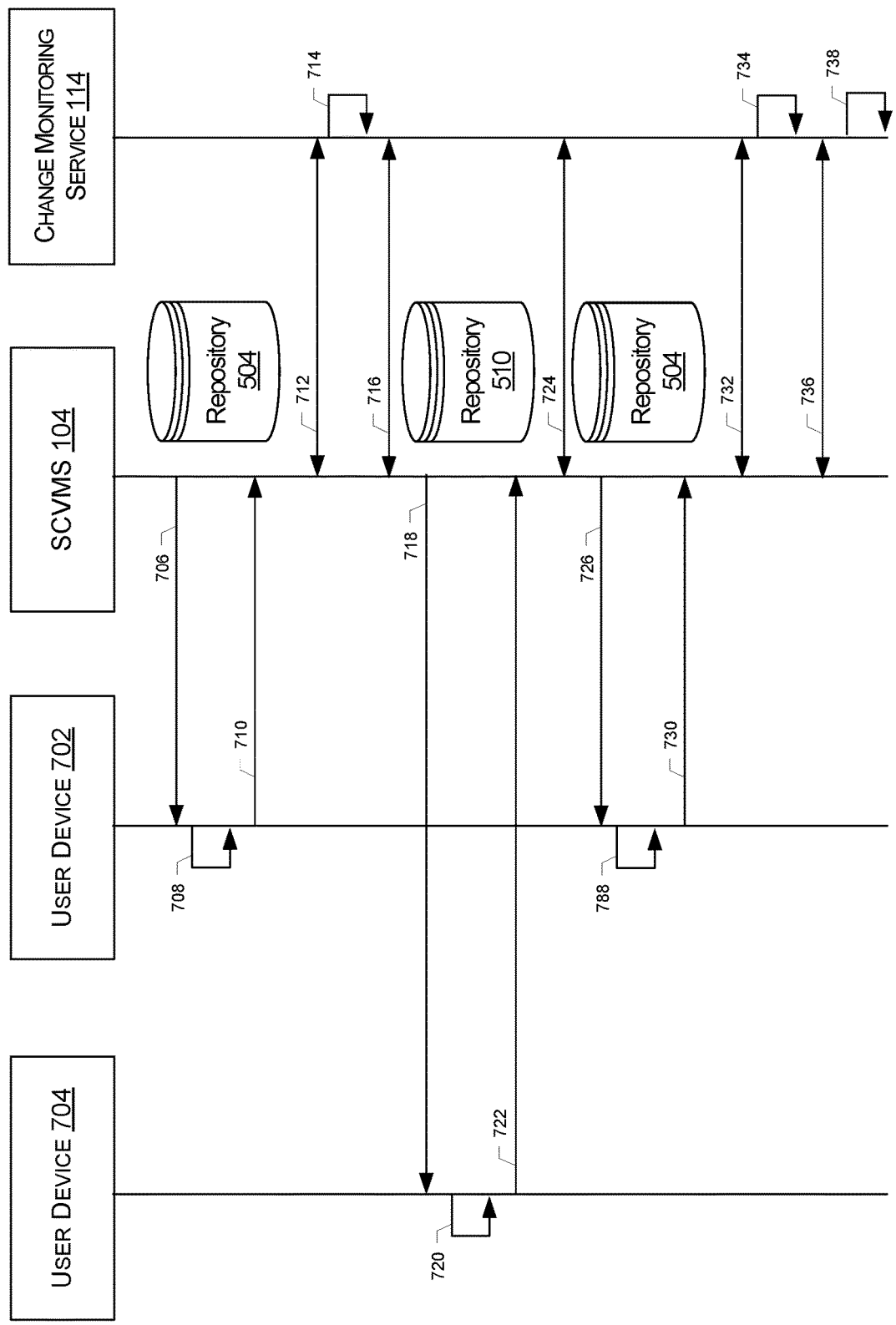
FIG. 7 is a flow diagram describing a method for obtaining code changes associated with a sidecar application, in accordance with at least one embodiment.

FIG. 7 is a flow diagram describing a method 700 for obtaining code changes associated with a sidecar application, in accordance with at least one embodiment. Prior to the execution of method 700, it is presumed that repositories 504 and 510 of FIG. 5 have been created and that SCVMS 104 of FIG. 1 has been configured to maintain the repositories 504 and 510.

At 706, user device 702 may be utilized to check out code from repository 504 associated with application 502 of FIG. 5. In some embodiments, the code checked out may include one or more configuration files associated with application 502.

At 708, the user device 702 may be utilized to insert a reference to a data repository associated with a sidecar application. By way of example, statement 602 may be added to one or more configuration files of the application 502.

At 710, the reference may be stored upon check-in within repository 504, a data repository (e.g., a git repository) associated with the application 502 of FIG. 5. Repository 502 may be maintained by the SCVMS 104.

At 712, the change monitoring service 114 may poll the SCVMS 104 for changes, or alternatively, the SCVMS 104 may report the changes made at 710 to the change monitoring service 114.

At 714, the change monitoring service 114 may obtain the statement 602 from the SCVMS 104 and dereference the statement 602 to identify one or more files associated with a sidecar application (e.g., the sidecar application 508).

At 716, the change monitoring service 114 may poll the SCVMS 104 for changes made to the sidecar application (e.g., the sidecar application 508). The change monitoring service 114 may determine that no changes have been made to the sidecar application since the last check-in of the file containing the reference within repository 504. In accordance with this determination, the change monitoring service 114 may end processing.

At 718, user device 704 may be utilized to check out code from repository 510 associated with sidecar application 508 of FIG. 5. In some embodiments, the code checked out may include one or more configuration files associated with sidecar application 508. In some embodiments, the checked out code may include configuration code segments, code segments describing the manner by which the sidecar application 508 is to be deployed, and/or code segments identifying the manner by which the sidecar application 508 is to be tested.

At 720, the user device 704 may be utilized to modify any suitable number of code segments corresponding to configuration, deployment, and/or testing of the sidecar application 508.

At 722, the code references may be stored upon check-in within repository 210, a data repository (e.g., a git repository) associated with the sidecar application 508 of FIG. 5. Repository 510 may be maintained by the SCVMS 104.

At 724, the change monitoring service 114 may poll the SCVMS 104 for changes, or alternatively, the SCVMS 104 may report the changes made at 722 to the change monitoring service 114. Although not depicted, in some embodiments, the change monitoring service 114 may identify that changes have been made to the code for which a reference exists in repository 504. Once identified, the change monitoring service 114 may execute any suitable operations for causing an update such that the modified version of the sidecar application is deployed alongside the application 502 for any subsequent deployments provided by CIOS. Additionally, or alternatively, the method 700 may proceed to 726.

At 726, user device 702 may be utilized to check out code from repository 504 associated with application 502 of FIG. 5. In some embodiments, the code checked out may include one or more configuration files associated with application 502. By way of example, the checked out code may include one or more files that include the statement 602.

At 728, the user device 702 may be utilized to make one or more changes to the checked out code.

At 730, the checked out code (and corresponding changes made at 728) may be stored upon check-in within repository 504, a data repository (e.g., a git repository) associated with the application 502 of FIG. 5.

At 732, the change monitoring service 114 may poll the SCVMS 104 for changes, or alternatively, the SCVMS 104 may report the changes made at 730 to the change monitoring service 114.

At 734, the change monitoring service 114 may obtain a reference (e.g., statement 602) from the SCVMS 104 and dereference the statement 602 to identify one or more files associated with a sidecar application (e.g., the sidecar application 508).

At 736, the change monitoring service 114 may poll the SCVMS 104 for changes made to the sidecar application (e.g., the sidecar application 508).

At 738, the change monitoring service 114 may determine that the change made at 722 occurred after the previous check-in of application 502 (e.g., the check-in conducted at 710, a check-in of one or more files including statement 602). In accordance with this determination, the change monitoring service 114 may execute any suitable operations for causing an update such that the modified version of the sidecar application (e.g., including the changes made at 722) is deployed alongside the application 502 for any subsequent deployments provided by CIOS. The method 700 may then end.

Figure 8:
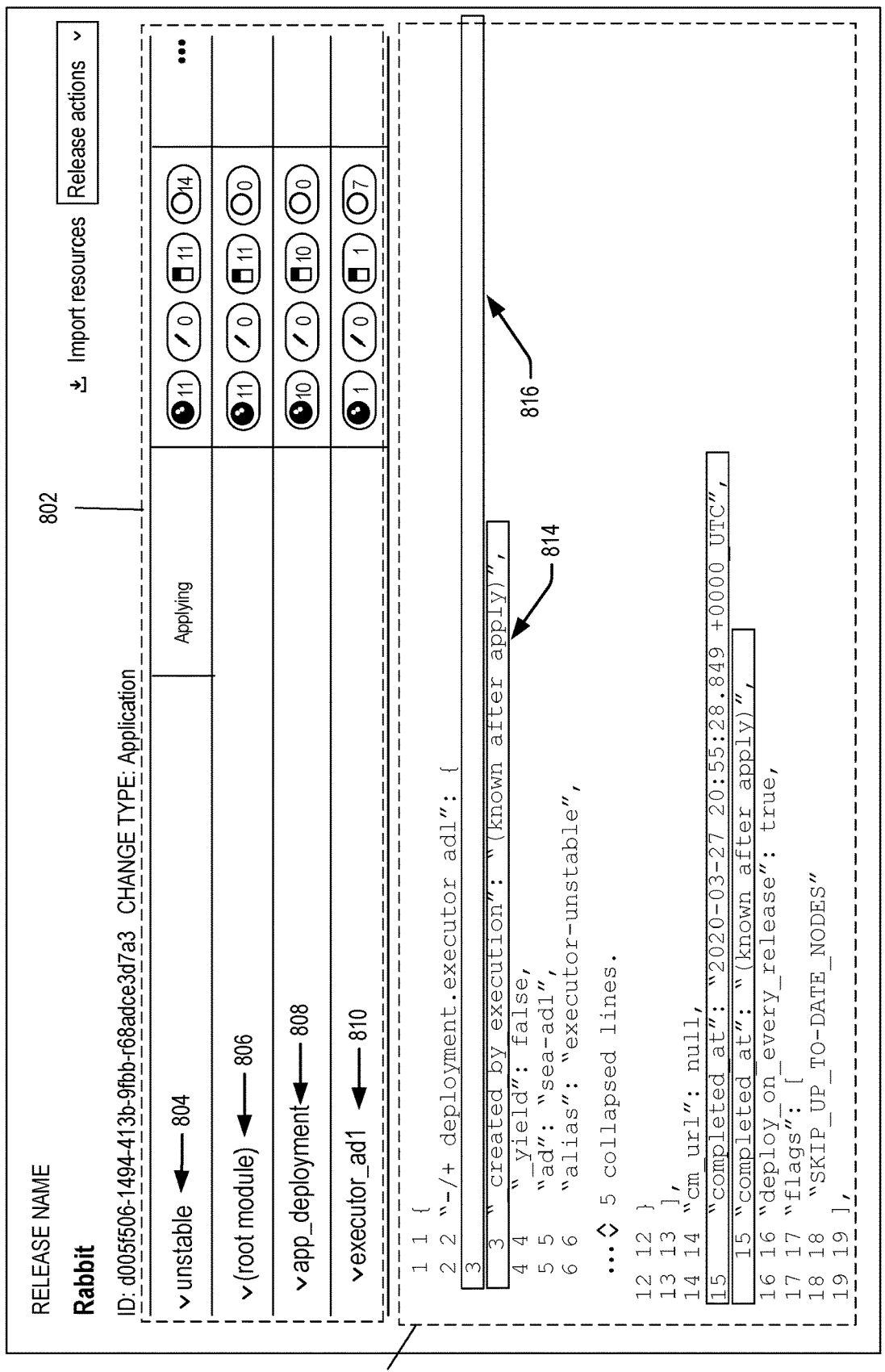
FIG. 8 is a schematic diagram illustrating an example user interface that depicts changes made to a sidecar application, according to at least one embodiment.

FIG. 8 is a schematic diagram illustrating an example user interface (e.g., UI 800) that shows changes made to a sidecar application (e.g., sidecar application 508 of FIG. 5), according to at least one embodiment. In some embodiments, the user interface 800 may be provided to a user of the user device 704 of FIG. 7 as part of the operations performed by the change monitoring service 114 at 738.

The UI 800 can include the execution task list 802, which can be located in any suitable location on the UI 800, and as illustrated, the execution task list 802 is at the top of the UI 800. The execution task 802 may correspond to modifying software resources (e.g., configuration code of application 502 of FIG. 5) associated with an execution target from a first state to a second state. In some embodiments, the UI 800 may be utilized to present a set of changes to be made to those software resources. As depicted, the execution task list 802 contains an execution task 804 corresponding to a target (e.g., labeled "unstable") that, when selected, can display a module 806, that, when selected in turn, can display module 808 (labeled "app deployment" as depicted) that, when selected, can display module 810. The execution target 1304 can display any suitable number of modules and/or application deployments corresponding to the execution task 804. In an embodiment with more than one module, the modules can be listed in order of descending number of create, update, delete, or no-change operations. By way of example, the modules 806-810 may be displayed such that the module with the highest number of creations may be listed at the top of the list and the remaining tasks may be displayed according to each task's corresponding number of creation operations in descending order. In some embodiments, the module 806-810 may be organized differently (e.g., in ascending order, or in any other suitable method for organizing modules 806-810). In some embodiments, when module 810 is selected, UI 800 may present log 812, and any other suitable information corresponding to the task 804.

The log 812 can be presented at any suitable location on the UI 800. The log 812 can present information about a changes made to the application code corresponding to module 810 (e.g., corresponding to the sidecar application 508 of FIG. 5). For example, line 814 may depict an added line of code while line 816 may depict a deleted line of code that is being replaced with line 814. In some embodiments, the line 814 (and/or any portion of code to be added) can be displayed with a green background or any other color background suitable for identifying one or more lines of code to be added. The line 816 (e.g., or any portion of code to be deleted) can be displayed with a red background of any other color background suitable for identifying one or more lines of code to be deleted.

Using the UI 800, the user may be enabled to view each planned code changes for each portion of a task. In some embodiments, the user may approve or decline each change. Thus, the UI 800 may be utilized by a user (e.g., a user associated with the application 502 of FIG. 5) to view changes made to a sidecar application, such that the user can approve or decline the various changes. Via the UI 800, the user is provided control over the particular versions of the sidecar application which is utilized in deployment of the application 502. Additionally, the user has visible access into the particular details of configuration, deployment, and/or testing associated with the sidecar application such that the user may make modifications and/or informed decisions related to utilizing the sidecar application 508 with the specific configuration of application 502.

Figure 9:
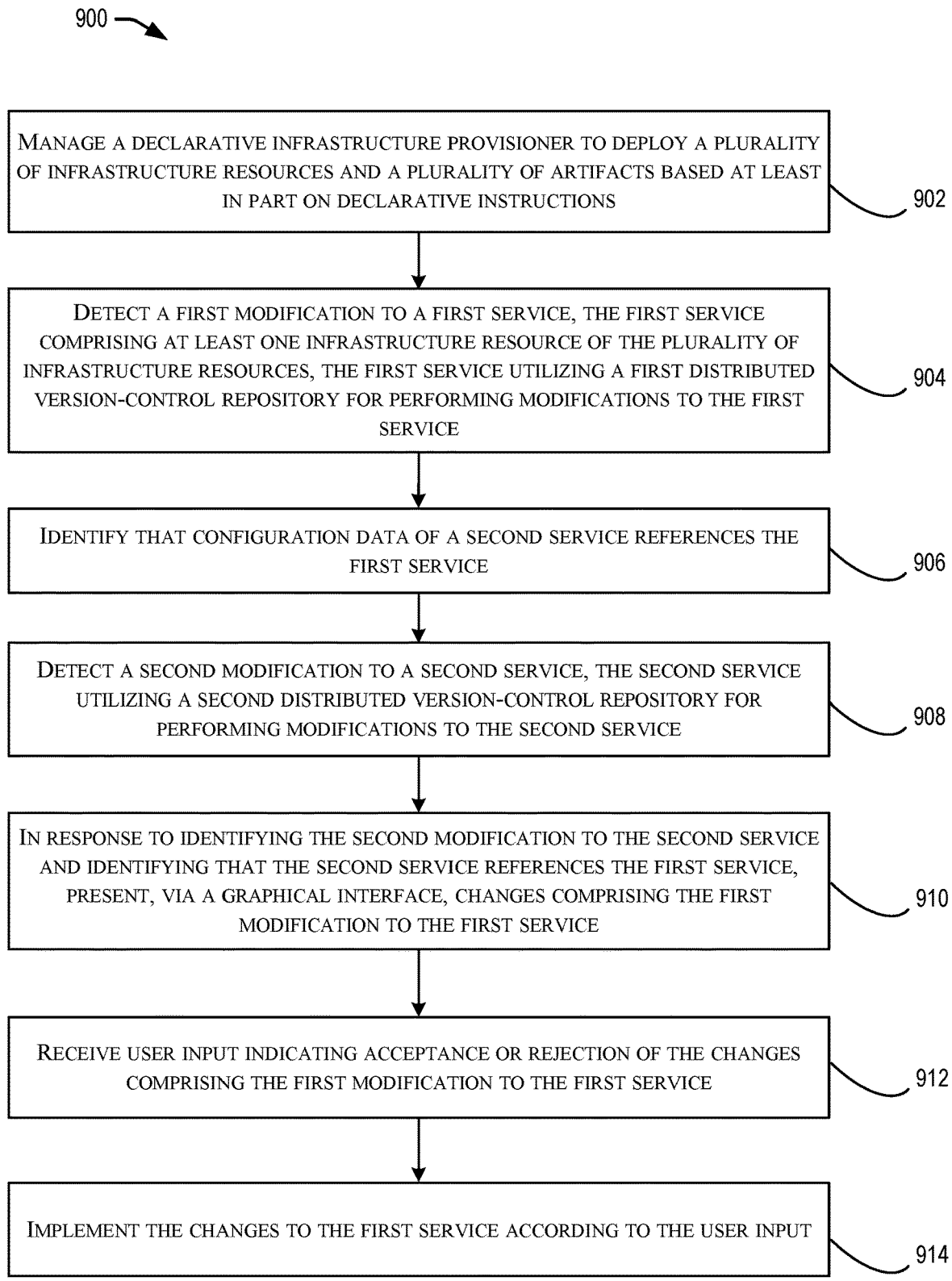
FIG. 9 is a flow chart of a method for implementing changes to a first service, by a computer infrastructure orchestration service in accordance with user input, according to at least one embodiment.

FIG. 9 is a flow chart of a method 900 for implementing changes to a first service, by a computer infrastructure orchestration service in accordance with user input, according to at least one embodiment. The method 900 may be performed by CIOS Central 102 of FIG. 1. As illustrated, method 900 includes a number of operations. However, method 900 may include more or fewer operations than provided in FIG. 9. These operations may be performed in any suitable order.

At block 902, a computer system may manage a declarative infrastructure provisioner (e.g., CIOS Regional 202 of FIG. 2) to deploy a plurality of infrastructure resources and a plurality of artifacts based at least in part on declarative instructions. CIOS Regional 202 may provision resources using a declarative file that describes components and how they interact. The configuration file can describe the resource and the relevant fields needed to create the element, and then as other elements can be described that reference the previously described elements. In some examples, a provisioning tool can then generate a workflow for creating and managing the elements that are described in the configuration file. The declarative infrastructure provisioner may, in some embodiments, utilize declarative statements formatted according to Terraform, a tool for building, changing, and versioning infrastructure components.

At block 904, CIOS Central 102 may detect (e.g., by the change monitoring service 114 of FIG. 1) a first modification to a first service (e.g., a change to sidecar application 508 of FIG. 5). In some embodiments, the first service comprises at least one infrastructure resource of the plurality of infrastructure resources. The first service may utilize a first distributed version-control repository (e.g., repository 510 of FIG. 5) for performing modifications to the first service.

At block 906, CIOS Central 102 (e.g., the change monitoring service 114) may identify that configuration data of a second service references the first service. By way of example, change monitoring service 114 may detect code segment 600 within a configuration file associated with an application (e.g., application 502 of FIG. 5).

At block 908, CIOS Central 102 (e.g., the change monitoring service 114) detects a second modification to a second service (e.g., a check-in of a configuration file associated with application 502). In some embodiments, the second service utilizes a second distributed version-control repository (repository 504 of FIG. 5) for performing modifications to the second service.

At block 910, in response to identifying the second modification to the second service and identifying that the second service references the first service, CIOS Central 102 may present via a graphical interface (e.g., UI 800 as provided by the view/plan/approve service 112 of FIG. 1), changes comprising the first modification to the first service.

At block 912, user input may be received (e.g., via UI 800) indicating acceptance or rejection of the changes comprising the first modification to the first service.

At block 914, changes to the first service may be implemented by CIOS Central 102 according to the user input. By way of example, CIOS Central 102 may perform any suitable operations to ensure that the sidecar application 508, as modified, is deployed alongside the application 502 in subsequent deployments (e.g., deployments performed by CIOS Regional 202).

Illustrative Systems

Figure 10:
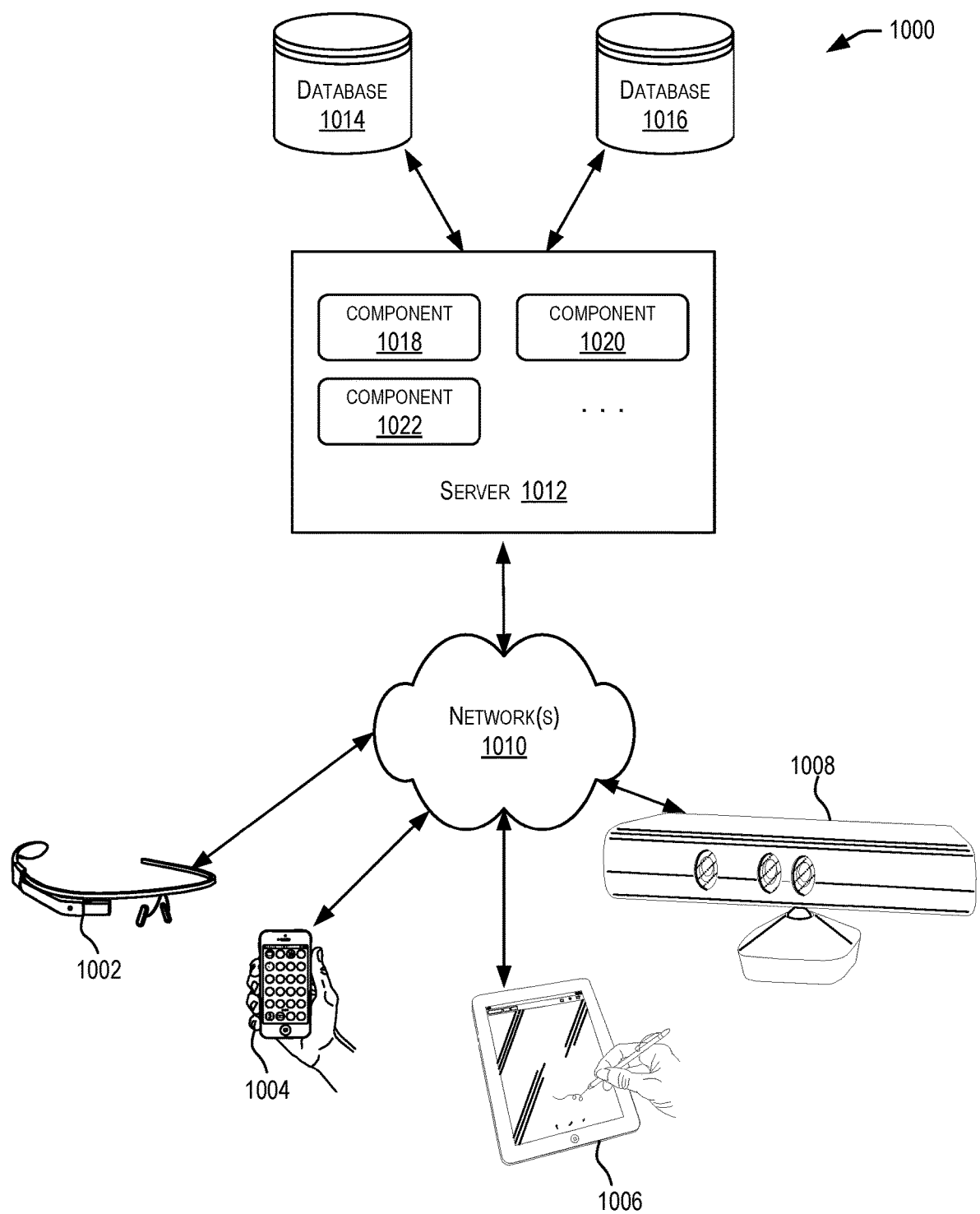
FIG. 10 is a block diagram of a distributed system, according to at least one embodiment.
Figure 11:
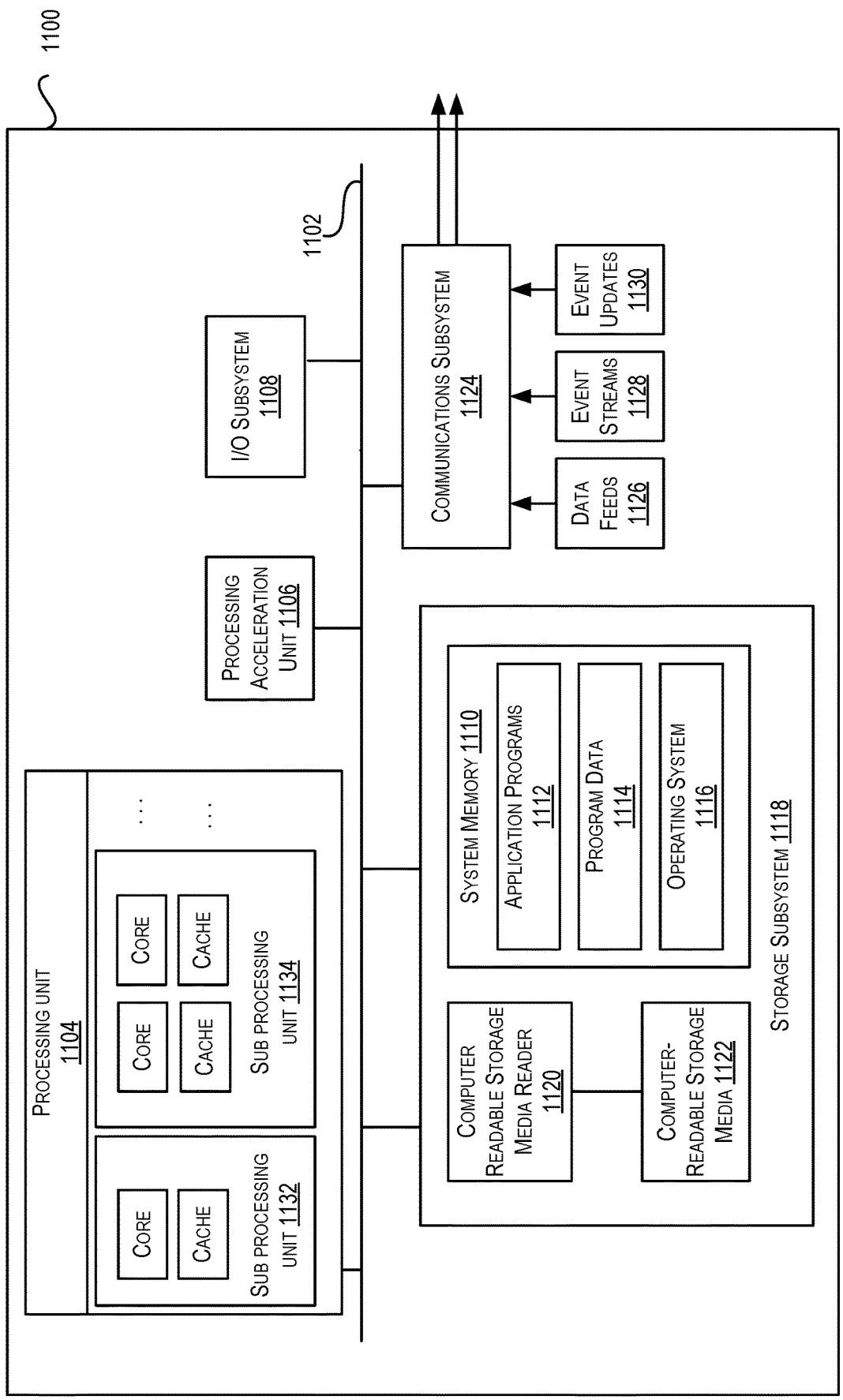
FIG. 11 is a block diagram of one or more components of a system environment by which services provided by one or more components of an embodiment system may be offered as cloud services, according to at least one embodiment.
Figure 12:
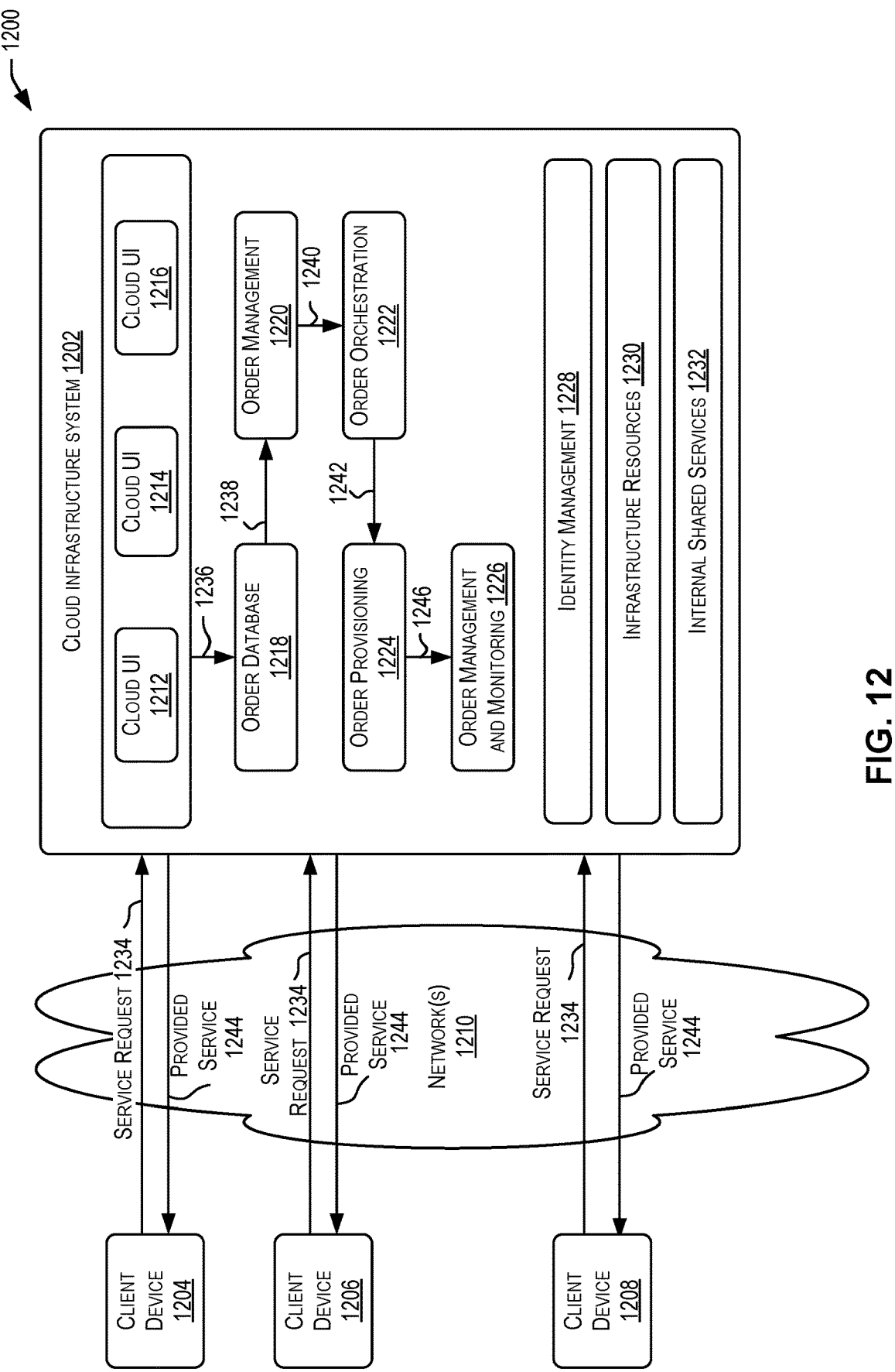
FIG. 12 is a block diagram of an example computer system, in which various embodiments of the present disclosure may be implemented.

FIGS. 10-12 illustrate aspects of example environments for implementing aspects of the present disclosure in accordance with various embodiments. FIG. 10 depicts a simplified diagram of a distributed system 1000 for implementing an embodiment of the present disclosure. In the illustrated embodiment, the distributed system 1000 includes one or more client computing devices 1002, 1004, 1006, and 1008, which are configured to execute and operate a client application such as a web browser, proprietary client (e.g., Oracle Forms), or the like over one or more network(s) 1010. The server 1012 may be communicatively coupled with the client computing devices 1002, 1004, 1006, and 1008 via network(s) 1010.

In various embodiments, the server 1012 may be adapted to run one or more services or software applications such as services and applications that provide identity management services. In certain embodiments, the server 1012 may also provide other services or software applications can include non-virtual and virtual environments. In some embodiments, these services may be offered as web-based or cloud services or under a Software as a Service (SaaS) model to the users of the client computing devices 1002, 1004, 1006, and/or 1008. Users operating the client computing devices 1002, 1004, 1006, and/or 1008 may in turn utilize one or more client applications to interact with the server 1012 to utilize the services provided by these components.

In the configuration depicted in FIG. 10, the software components 1018, 1020 and 1022 of system 1000 are shown as being implemented on the server 1012. In other embodiments, one or more of the components of the system 1000 and/or the services provided by these components may also be implemented by one or more of the client computing devices 1002, 1004, 1006, and/or 1008. Users operating the client computing devices may then utilize one or more client applications to use the services provided by these components. These components may be implemented in hardware, firmware, software, or combinations thereof. It should be appreciated that various different system configurations are possible, which may be different from distributed system 1000. The embodiment shown in FIG. 10 is thus one example of a distributed system for implementing an embodiment system and is not intended to be limiting.

The client computing devices 1002, 1004, 1006, and/or 1008 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over the network(s) 1010.

Although distributed system 1000 in FIG. 10 is shown with four client computing devices, any number of client computing devices may be supported. Other devices, such as devices with sensors, etc., may interact with the server 1012.

The network(s) 1010 in the distributed system 1000 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 1010 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.16 suite of protocols, Bluetooth®, and/or any other wireless protocol), and/or any combination of these and/or other networks.

The server 1012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 1012 can include one or more virtual machines running virtual operating systems, or other computing architectures involving virtualization. One or more flexible pools of logical storage devices can be virtualized to maintain virtual storage devices for the server. Virtual networks can be controlled by the server 1012 using software defined networking. In various embodiments, the server 1012 may be adapted to run one or more services or software applications described in the foregoing disclosure. For example, the server 1012 may correspond to a server for performing processing as described above according to an embodiment of the present disclosure.

The server 1012 may run an operating system including any of those discussed above, as well as any commercially available server operating system. Server 1012 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Example database servers include without limitation those commercially available from Oracle, Microsoft, Sybase, IBM (International Business Machines), and the like.

In some implementations, the server 1012 may include one or more applications to analyze and consolidate data feeds and/or event updates received from users of the client computing devices 1002, 1004, 1006, and 1008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. The server 1012 may also include one or more applications to display the data feeds and/or real-time events via one or more display devices of the client computing devices 1002, 1004, 1006, and 1008.

The distributed system 1000 may also include one or more databases 1014 and 1016. These databases may provide a mechanism for storing information such as user identity information, and other information used by embodiments of the present disclosure. Databases 1014 and 1016 may reside in a variety of locations. By way of example, one or more of databases 1014 and 1016 may reside on a non-transitory storage medium local to (and/or resident in) the server 1012. Alternatively, the databases 1014 and 1016 may be remote from the server 1012 and in communication with the server 1012 via a network-based or dedicated connection. In one set of embodiments, the databases 1014 and 1016 may reside in a storage-area network (SAN). Similarly, any necessary files for performing the functions attributed to the server 1012 may be stored locally on the server 1012 and/or remotely, as appropriate. In one set of embodiments, the databases 1014 and 1016 may include relational databases, such as databases provided by Oracle, that are adapted to store, update, and retrieve data in response to SQL-formatted commands.

FIG. 11 illustrates an example computer system 1100 that may be used to implement an embodiment of the present disclosure. In some embodiments, computer system 1100 may be used to implement any of the various servers and computer systems described above. As shown in FIG. 11, computer system 1100 includes various subsystems including a processing subsystem 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 may include tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1104 controls the operation of computer system 1100 and may comprise one or more processing units 1132, 1134, etc. A processing unit may include be one or more processors, including single core or multicore processors, one or more cores of processors, or combinations thereof. In some embodiments, processing subsystem 1104 can include one or more special purpose co-processors such as graphics processors, digital signal processors (DSPs), or the like. In some embodiments, some or all of the processing units of processing subsystem 1104 can be implemented using customized circuits, such as application specific integrated circuits (ASICs), or field programmable gate arrays (FPGAs).

In some embodiments, the processing units in processing subsystem 1104 can execute instructions stored in system memory 1110 or on computer readable storage media 1122. In various embodiments, the processing units can execute a variety of programs or code instructions and can maintain multiple concurrently executing programs or processes. At any given time, some or all of the program code to be executed can be resident in system memory 1110 and/or on computer-readable storage media 1110 including potentially on one or more storage devices. Through suitable programming, processing subsystem 1104 can provide various functionalities described above for dynamically modifying documents (e.g., webpages) responsive to usage patterns.

In certain embodiments, a processing acceleration unit 1106 may be provided for performing customized processing or for off-loading some of the processing performed by processing subsystem 1104 so as to accelerate the overall processing performed by computer system 1100.

I/O subsystem 1108 may include devices and mechanisms for inputting information to computer system 1100 and/or for outputting information from or via computer system 1100. In general, use of the term "input device" is intended to include all possible types of devices and mechanisms for inputting information to computer system 1100. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1118 provides a repository or data store for storing information that is used by computer system 1100. Storage subsystem 1118 provides a tangible non-transitory computer-readable storage medium for storing the basic programming and data constructs that provide the functionality of some embodiments. Software (programs, code modules, instructions) that when executed by processing subsystem 1104 provide the functionality described above may be stored in storage subsystem 1118. The software may be executed by one or more processing units of processing subsystem 1104. Storage subsystem 1118 may also provide a repository for storing data used in accordance with the present disclosure.

Storage subsystem 1118 may include one or more non-transitory memory devices, including volatile and non-volatile memory devices. As shown in FIG. 11, storage subsystem 1118 includes a system memory 1110 and a computer-readable storage media 1122. System memory 1110 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1100, such as during start-up, may be stored in the ROM. The RAM may contain data and/or program modules that are presently being operated and executed by processing subsystem 1104. In some implementations, system memory 1110 may include multiple different types of memory, such as static random access memory (SRAM) or dynamic random access memory (DRAM).

By way of example, and not limitation, as depicted in FIG. 11, system memory 1110 may store application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1122 may store programming and data constructs that provide the functionality of some embodiments. Software (programs, code modules, instructions) that when executed by processing subsystem 1104 a processor provide the functionality described above may be stored in storage subsystem 1118. By way of example, computer-readable storage media 1122 may include non-volatile memory such as a hard disk drive, a magnetic disk drive, an optical disk drive such as a CD ROM, DVD, a Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1122 may provide storage of computer-readable instructions, data structures, program modules, and other data for computer system 1100.

In certain embodiments, storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for storing computer-readable information.

In certain embodiments, computer system 1100 may provide support for executing one or more virtual machines. Computer system 1100 may execute a program such as a hypervisor for facilitating the configuring and managing of the virtual machines. Each virtual machine may be allocated memory, compute (e.g., processors, cores), I/O, and networking resources. Each virtual machine may run its own operating system, which may be the same as or different from the operating systems executed by other virtual machines executed by computer system 1100. Accordingly, multiple operating systems may potentially be run concurrently by computer system 1100. Each virtual machine generally runs independently of the other virtual machines.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to establish a communication channel to one or more client devices via the Internet for receiving and sending information from and to the client devices. Additionally, communication subsystem 1124 may be used to communicate notifications of successful logins or notifications to re-enter a password from the privileged account manager to the requesting users.

Communication subsystem 1124 may support both wired and/or wireless communication protocols. For example, in certain embodiments, communications subsystem 1124 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

Communication subsystem 1124 can receive and transmit data in various forms. For example, in some embodiments, communications subsystem 1124 may receive input communication in the form of structured and/or unstructured data feeds 1126, event streams 1128, event updates 1130, and the like. For example, communications subsystem 1124 may be configured to receive (or send) data feeds 1126 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1124 may be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1100 depicted in FIG. 11 is intended only as a specific example. Many other configurations having more or fewer components than the system depicted in FIG. 11 are possible. Based on the disclosure and teachings provided herein, a person of ordinary skill in the art will appreciate other ways and/or methods to implement the various embodiments.

Systems depicted in some of the figures may be provided in various configurations. In some embodiments, the systems may be configured as a distributed system where one or more components of the system are distributed across one or more networks in one or more cloud infrastructure systems.

A cloud infrastructure system is a collection of one or more server computing devices, network devices, and/or storage devices. These resources may be divided by cloud services providers and allotted to its customers in some manner. For example, a cloud services provider, such as Oracle Corporation of Redwood Shores, Calif., may offer various types of cloud services including but not limited to one or more services provided under Software as a Service (SaaS) category, services provided under Platform as a Service (PaaS) category, services provided under Infrastructure as a Service (IaaS) category, or other categories of services including hybrid services. Examples of SaaS services include, without limitation, capabilities to build and deliver a suite of on-demand applications such as Oracle Fusion applications. SaaS services enable customers to utilize applications executing on the cloud infrastructure system without the need for customers to purchase software for the applications. Examples of PaaS services include without limitation services that enable organizations (such as Oracle) to consolidate existing applications on a shared, common architecture, as well as the ability to build new applications that leverage the shared services provided by the platform such as Oracle Java Cloud Service (JCS), Oracle Database Cloud Service (DBCS), and others. IaaS services may facilitate the management and control of the underlying computing resources, such as storage, networks, and other fundamental computing resources for customers utilizing services provided by the SaaS platform and the PaaS platform.

FIG. 12 is a simplified block diagram of one or more components of a system environment 1200 by which services provided by one or more components of an embodiment system may be offered as cloud services, in accordance with an embodiment of the present disclosure. In the illustrated embodiment, system environment 1200 includes one or more client computing devices 1204, 1206, and 1208 that may be used by users to interact with a cloud infrastructure system 1202 that provides cloud services. The client computing devices may be configured to operate a client application such as a web browser, a proprietary client application (e.g., Oracle Forms), or some other application, which may be used by a user of the client computing device to interact with cloud infrastructure system 1202 to use services provided by cloud infrastructure system 1202.

It should be appreciated that cloud infrastructure system 1202 depicted in the figure may have other components than those depicted. Further, the embodiment shown in the figure is only one example of a cloud infrastructure system that may incorporate an embodiment of the disclosure. In some other embodiments, cloud infrastructure system 1202 may have more or fewer components than shown in the figure, may combine two or more components, or may have a different configuration or arrangement of components.

Client computing devices 1204, 1206, and 1208 may be devices similar to those described above for 1002, 1004, 1006, and 1008.

Although example system environment 1200 is shown with three client computing devices, any number of client computing devices may be supported. Other devices such as devices with sensors, etc. may interact with cloud infrastructure system 1202.

Network(s) 1210 may facilitate communications and exchange of data between client computing devices 1204, 1206, and 1208 and cloud infrastructure system 1202. Each network may be any type of network familiar to those skilled in the art that can support data communications using any of a variety of commercially-available protocols, including those described above for network(s) 1210.

Cloud infrastructure system 1202 may comprise one or more computers and/or servers that may include those described above for server 1212.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." In a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1202 may be adapted to automatically provision, manage and track a customer's subscription to services offered by cloud infrastructure system 1202. Cloud infrastructure system 1202 may provide the cloud services via different deployment models. For example, services may be provided under a public cloud model in which cloud infrastructure system 1202 is owned by an organization selling cloud services (e.g., owned by Oracle) and the services are made available to the general public or different industry enterprises. As another example, services may be provided under a private cloud model in which cloud infrastructure system 1202 is operated solely for a single organization and may provide services for one or more entities within the organization. The cloud services may also be provided under a community cloud model in which cloud infrastructure system 1202 and the services provided by cloud infrastructure system 1202 are shared by several organizations in a related community. The cloud services may also be provided under a hybrid cloud model, which is a combination of two or more different models.

In some embodiments, the services provided by cloud infrastructure system 1202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1202. Cloud infrastructure system 1202 then performs processing to provide the services in the customer's subscription order.

In some embodiments, the services provided by cloud infrastructure system 1202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1202 may also include infrastructure resources 1230 for providing the resources used to provide various services to customers of the cloud infrastructure system. In one embodiment, infrastructure resources 1230 may include pre-integrated and optimized combinations of hardware, such as servers, storage, and networking resources to execute the services provided by the PaaS platform and the SaaS platform.

In some embodiments, resources in cloud infrastructure system 1202 may be shared by multiple users and dynamically re-allocated per demand. Additionally, resources may be allocated to users in different time zones. For example, cloud infrastructure system 1230 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1232 may be provided that are shared by different components or modules of cloud infrastructure system 1202 and by the services provided by cloud infrastructure system 1202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1202 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1202, and the like.

In one embodiment, as depicted in the figure, cloud management functionality may be provided by one or more modules, such as an order management module 1220, an order orchestration module 1222, an order provisioning module 1224, an order management and monitoring module 1226, and an identity management module 1228. These modules may include or be provided using one or more computers and/or servers, which may be general purpose computers, specialized server computers, server farms, server clusters, or any other appropriate arrangement and/or combination.

In example operation 1234, a customer using a client device, such as client computing devices 1204, 1206 or 1208, may interact with cloud infrastructure system 1202 by requesting one or more services provided by cloud infrastructure system 1202 and placing an order for a subscription for one or more services offered by cloud infrastructure system 1202. In certain embodiments, the customer may access a cloud User Interface (UI), cloud UI 1216, cloud UI 1214 and/or cloud UI 1216 and place a subscription order via these UIs. The order information received by cloud infrastructure system 1202 in response to the customer placing an order may include information identifying the customer and one or more services offered by the cloud infrastructure system 1202 that the customer intends to subscribe to.

After an order has been placed by the customer, the order information is received via the cloud UIs, 1212, 1214 and/or 1216.

At operation 1236, the order is stored in order database 1218. Order database 1218 can be one of several databases operated by cloud infrastructure system 1202 and operated in conjunction with other system elements.

At operation 1238, the order information is forwarded to an order management module 1220. In some instances, order management module 1220 may be configured to perform billing and accounting functions related to the order, such as verifying the order, and upon verification, booking the order.

At operation 1240, information regarding the order is communicated to an order orchestration module 1222. Order orchestration module 1222 may utilize the order information to orchestrate the provisioning of services and resources for the order placed by the customer. In some instances, order orchestration module 1222 may orchestrate the provisioning of resources to support the subscribed services using the services of order provisioning module 1224.

In certain embodiments, order orchestration module 1222 enables the management of business processes associated with each order and applies business logic to determine whether an order should proceed to provisioning. At operation 1242, upon receiving an order for a new subscription, order orchestration module 1222 sends a request to order provisioning module 1224 to allocate resources and configure those resources needed to fulfill the subscription order. Order provisioning module 1224 enables the allocation of resources for the services ordered by the customer. Order provisioning module 1224 provides a level of abstraction between the cloud services provided by cloud infrastructure system 1202 and the physical implementation layer that is used to provision the resources for providing the requested services. Order orchestration module 1222 may thus be isolated from implementation details, such as whether or not services and resources are actually provisioned on the fly or pre-provisioned and only allocated/assigned upon request.

At operation 1244, once the services and resources are provisioned, a notification of the provided service may be sent to customers on client computing devices 1204, 1206 and/or 1208 by order provisioning module 1224 of cloud infrastructure system 1202. At operation 1246, the customer's subscription order may be managed and tracked by an order management and monitoring module 1226. In some instances, order management and monitoring module 1226 may be configured to collect usage statistics for the services in the subscription order, such as the amount of storage used, the amount data transferred, the number of users, and the amount of system up time and system down time.

In certain embodiments, cloud infrastructure system 1202 may include an identity management module 1228. Identity management module 1228 may be configured to provide identity services, such as access management and authorization services in cloud infrastructure system 1202. In some embodiments, identity management module 1228 may control information about customers who wish to utilize the services provided by cloud infrastructure system 1202. Such information can include information that authenticates the identities of such customers and information that describes which actions those customers are authorized to perform relative to various system resources (e.g., files, directories, applications, communication ports, memory segments, etc.). Identity management module 1228 may also include the management of descriptive information about each customer and about how and by whom that descriptive information can be accessed and modified.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

What is claimed is:

1. A computer-implemented method, comprising:
managing, by a computing system configured to provide cloud-computing infrastructure as a service, a declarative infrastructure provisioner configured to provision a plurality of infrastructure resources within a cloud-computing environment and deploy a plurality of artifacts to one or more of the plurality of infrastructure resources, the plurality of infrastructure resources being provisioned based at least in part on acquiring one or more virtual hosts of the cloud-computing environment for use, the plurality of artifacts being deployed based at least in part on deploying code corresponding to one or more services to a newly acquired computer or virtual host of the cloud-computing environment;
detecting, by the computing system, a first modification to a first service, the first service being associated with at least one infrastructure resource of the plurality of infrastructure resources, the first service utilizing a first distributed version-control repository for performing modifications to the first service;
in response to detecting the first modification to the first service, generating a cloned submodule of a second distributed version-control repository, the second distributed version control repository being associated with modifications performed on artifacts of a second service, and the cloned submodule being generated based at least in part on dereferencing a statement of a configuration file corresponding to the first service;
detecting, by the computing system from the cloned submodule, a second modification to the second service;
in response to detecting the second modification to the second service, presenting, by the computing system via a graphical interface, changes comprising the second modification to the second service;
receiving, by the computing system, user input indicating acceptance of the second modification to the second service;
provisioning, by the declarative infrastructure provisioner, an infrastructure resource within the cloud-computing environment; and
based at least in part on the user input indicating acceptance of the second modification to the second service, executing operations to cause a modified version of the second service comprising the second modification to be deployed with the first service to the infrastructure resource provisioned by the computer system.

2. The computer-implemented method of claim 1, wherein the second modification to the second service comprises a modification to at least two of: implementation code, deployment instructions, or testing instructions associated with the first service.

3. The computer-implemented method of claim 1, further comprising:
parsing the configuration file associated with the first service; and
identifying that the configuration file references the second distributed version-control repository.

4. The computer-implemented method of claim 1, wherein the first distributed version-control repository and the second distributed version-control repository are git repositories and the second service is a side-car application.

5. The computer-implemented method of claim 1, wherein implementing the changes according to the user input comprises executing at least a portion of the second modification to the second service within the second distributed version-control repository when the user input indicates acceptance.

6. The computer-implemented method of claim 1, wherein the user input indicates acceptable of a first portion of the second modification and a rejection of a second portion of the second modification.

7. The computer-implemented method of claim 1, wherein first functionality provided by the first service when executed is dependent on second functionality provided by the second service when executed.

8. A system configured to provide cloud-computing infrastructure as a service, the system comprising:
one or more processors; and
one or more memories storing computer-executable instructions that, when executed by the one or more processors, cause the one or more processors to:
manage a declarative infrastructure provisioner configured to provision a plurality of infrastructure resources within a cloud-computing environment and deploy a plurality of artifacts to one or more of the plurality of infrastructure resources, the plurality of infrastructure resources being provisioned based at least in part on acquiring one or more virtual hosts of the cloud-computing environment for use, the plurality of artifacts being deployed based at least in part on deploying code corresponding to one or more services to a newly acquired computer or virtual host of the cloud-computing environment;

detect a first modification to a first service, the first service being associated with at least one infrastructure resource of the plurality of infrastructure resources, the first service utilizing a first distributed version-control repository for performing modifications to the first service;

in response to detecting the first modification to the first service, generate a cloned submodule of a second distributed version-control repository, the second distributed version control repository being associated with modifications performed on artifacts of a second service, and the cloned submodule being generated based at least in part on dereferencing a statement of a configuration file corresponding to the first service:

detect, from the cloned submodule, a second modification to the second service;

in response to detecting the second modification to the second service, present, via a graphical interface, changes comprising the second modification to the second service;

receive user input indicating acceptance or rejection of the changes comprising the second modification to the second service;

provision, by the declarative infrastructure provisioner, an infrastructure resource within the cloud-computing environment; and based at least in part on the user input indicating acceptance of the second modification to the second service, execute operations to cause a modified version of the second service comprising the second modification to be deployed with the first service to the infrastructure resource provisioned by the system.

9. The system of claim 8, wherein the second modification to the second service comprises a modification to at least two of: implementation code, deployment instructions, or testing instructions associated with the first service.

10. The system of claim 8, wherein executing the computer-executable instructions further causes the one or more processors to:
parse the configuration file associated with the second first service; and
identify that the configuration file references the second distributed version-control repository.

11. The system of claim 8, wherein the first distributed version-control repository and the second distributed version-control repository are git repositories and the second service is a side-car application.

12. The system of claim 8, wherein implementing the changes according to the user input comprises executing at least a portion of the second modification to the second service within the second distributed version-control repository when the user input indicates acceptance.

13. The system of claim 8, wherein the user input indicates acceptable of a first portion of the second modification and a rejection of a second portion of the second modification.

14. The system of claim 8, wherein executing the computer-executable instructions further causes the one or more processors to implement the changes according to the user input, and wherein implementing the changes according to the user input comprises executing operations to cause the second distributed version-control repository to reference a previous version of the second service, the previous version existing prior to the second modification of the second service.

15. A computer-readable storage medium storing computer-executable instructions that, when executed by one or more processors of a computer system configured to provide cloud-computing infrastructure as a service, cause the one or more processors to perform operations comprising:
managing a declarative infrastructure provisioner configured to provision a plurality of infrastructure resources within a cloud-computing environment and deploy a plurality of artifacts to one or more of the plurality of infrastructure resources, the plurality of infrastructure resources being provisioned based at least in part on acquiring one or more virtual hosts of the cloud-computing environment for use, the plurality of artifacts being deployed based at least in part on deploying code corresponding to one or more services to a newly acquired computer or virtual host of the cloud-computing environment;
detecting a first modification to a first service, the first service comprising being associated with at least one infrastructure resource of the plurality of infrastructure resources, the first service utilizing a first distributed version-control repository for performing modifications to the first service;
in response to detecting the first modification to the first service, generating a cloned submodule of a second distributed version-control repository, the second distributed version control repository being associated with modifications performed on artifacts of a second service, and the cloned submodule being generated based at least in part on dereferencing a statement of a configuration file corresponding to the first service;
detecting, from the cloned submodule, a second modification to the second service;
in response to detecting the second modification to the second service, presenting, by the computing system via a graphical interface, changes comprising the second modification to the second service;
receiving user input indicating acceptance of the second modification to the second service;
provisioning, by the declarative infrastructure provisioner, an infrastructure resource within the cloud-computing environment; and
based at least in part on the user input indicating acceptance of the second modification to the second service, executing operations to cause a modified version of the second service comprising the second modification to be deployed with the first service to the infrastructure resource provisioned by the computer system.

16. The computer-readable storage medium of claim 15, wherein the second modification to the second service comprises a modification to at least two of: implementation code, deployment instructions, or testing instructions associated with the first service.

17. The computer-readable storage medium of claim 15, wherein executing the computer-executable instructions further cause the one or more processors to:
parse the configuration file associated with the first service; and
identify that the configuration file references the second distributed version-control repository.

18. The computer-readable storage medium of claim 15, wherein the first distributed version-control repository and the second distributed version-control repository are git repositories and the second service is a side-car application.

19. The computer-readable storage medium of claim 15, wherein implementing the changes according to the user input comprises executing at least a portion of the second modification to the second service within the second distributed version-control repository when the user input indicates acceptance.

20. The computer-readable storage medium of claim 15, wherein executing the computer-executable instructions further causes the one or more processors to implement the changes according to the user input, and wherein implementing the changes according to the user input comprises executing operations to cause the second distributed version-control repository to reference a previous version of the second service, the previous version existing prior to the second modification of the second service.

\* \* \* \* \*

UNITED STATES PATENT AND TRADEMARK OFFICE
CERTIFICATE OF CORRECTION

| | |
|---|---|
| PATENT NO. | : 11,520,635 B2 |
| APPLICATION NO. | : 17/103733 |
| DATED | : December 6, 2022 |
| INVENTOR(S) | : Eric Tyler Barsalou |

It is certified that error appears in the above-identified patent and that said Letters Patent is hereby corrected as shown below:

On the Title Page

On page 2, Column 2, item (56) under Other Publications, Line 2, delete "EngineeringMay" and insert -- Engineering May --, therefor.

On page 2, Column 2, item (56) under Other Publications, Line 32, delete "39-46https" and insert -- 39-46 https --, therefor.

In the Drawings

On sheet 1 of 12, in FIG. 1, and on the Title Page, the illustrative print figure, under Reference Numeral 126, Line 1, delete "Gatway" and insert -- Gateway --, therefor.

In the Specification

In Column 1, Lines 4-5, below "APPLICATION UPDATES" delete "TECHNIQUES FOR RESOLVING APPLICATION UPDATES".

In Column 1, Line 35, delete "62/963,486" and insert -- 62/963,486, --, therefor.

In Column 4, Line 45, delete "demand)" and insert -- demand)) --, therefor.

In Column 7, Line 3, delete "$manualApproval"" and insert -- $manualApproval". --, therefor.

In Column 10, Line 15, delete "ACLSs" and insert -- ACLs --, therefor.

In Column 10, Line 46, delete "nodes" and insert -- nodes. --, therefor.

In Column 10, Line 48, delete "available" and insert -- available. --, therefor.

Signed and Sealed this
Eighth Day of August, 2023

Katherine Kelly Vidal
*Director of the United States Patent and Trademark Office*

CERTIFICATE OF CORRECTION (continued)
U.S. Pat. No. 11,520,635 B2

In Column 10, Line 50, delete "available" and insert -- available. --, therefor.

In the Claims

In Column 32, Line 2, in Claim 1, delete "version control" and insert -- version-control --, therefor.

In Column 32, Line 40, in Claim 4, delete "side-car" and insert -- sidecar --, therefor.

In Column 33, Line 20, in Claim 8, delete "service:" and insert -- service; --, therefor.

In Column 33, Line 47, in Claim 10, before "first" delete "second", therefor.

In Column 33, Line 54, in Claim 11, delete "side-car" and insert -- sidecar --, therefor.

In Column 34, Line 24, in Claim 15, before "being" delete "comprising", therefor.

In Column 34, Line 61, in Claim 17, delete "cause" and insert -- causes --, therefor.

In Column 35, Line 2, in Claim 18, delete "side-car" and insert -- sidecar --, therefor.